US012538965B2

(12) United States Patent
Strickland, Jr.

(10) Patent No.: US 12,538,965 B2
(45) Date of Patent: Feb. 3, 2026

(54) RELEASABLE SHOE FASTENING DEVICE

(71) Applicant: GCLIProw, Inc., Buffalo, NY (US)

(72) Inventor: Gerald Lewis Strickland, Jr., Buffalo, NY (US)

( * ) Notice: Subject to any disclaimer, the term of this patent is extended or adjusted under 35 U.S.C. 154(b) by 0 days.

(21) Appl. No.: 18/283,077

(22) PCT Filed: Mar. 24, 2022

(86) PCT No.: PCT/US2022/021831
§ 371 (c)(1),
(2) Date: Sep. 20, 2023

(87) PCT Pub. No.: WO2022/204448
PCT Pub. Date: Sep. 29, 2022

(65) Prior Publication Data

US 2024/0164487 A1 May 23, 2024

Related U.S. Application Data

(60) Provisional application No. 63/165,449, filed on Mar. 24, 2021.

(51) Int. Cl.
*A43B 5/14* (2006.01)
*A43C 11/06* (2006.01)
(Continued)

(52) U.S. Cl.
CPC ................ *A43C 11/06* (2013.01); *A43B 5/14* (2013.01); *B62M 3/086* (2013.01); *B63H 16/02* (2013.01)

(58) Field of Classification Search
CPC ........... A43B 5/14; B62M 3/086; B63H 16/02
See application file for complete search history.

(56) References Cited

U.S. PATENT DOCUMENTS 5,765,450 A 6/1998 Kruger et al.
6,405,614 B1 6/2002 Beyl
(Continued)

FOREIGN PATENT DOCUMENTS

DE 3912576 A * 10/1990 ............ B62M 3/086
EP 2692622 A1 2/2014
(Continued)

OTHER PUBLICATIONS

PCT Search Report and Written Opinion for PCT/US2022/021831, mailed Jun. 9, 2022, 14 pages.
(Continued)

*Primary Examiner* — Daniel D Yabut
(74) *Attorney, Agent, or Firm* — Dicke, Billig & Czaja, PLLC

(57) ABSTRACT

A device includes a cleat and a receiver. The cleat is mountable to a shoe and includes a front portion and a rear footing. The receiver is mountable to a support of an external device. The receiver includes a frame including a front portion and a rear portion, with the rear portion configured to removably slidably receive the rear footing of the cleat. The front portion of the receiver includes a catch element, which is pivotally movable relative to the frame while under a rotational biasing force in a first orientation, to permit slidable entry of, and retention of, the front portion of the cleat relative to the frame of the receiver.

16 Claims, 25 Drawing Sheets

(51) Int. Cl.

| | |
|---|---|
| ***B62M 3/08*** | (2006.01) |
| ***B63H 16/02*** | (2006.01) |

(56) References Cited

U.S. PATENT DOCUMENTS

| | | | | |
|---|---|---|---|---|
| 6,477,917 | B1 | 11/2002 | Peyre et al. | |
| D506,308 | S | 6/2005 | Chretien et al. | |
| 7,104,159 | B2 | 9/2006 | Plassiard et al. | |
| 7,240,587 | B2 | 7/2007 | Plassiard et al. | |
| 7,421,971 | B1 | 9/2008 | Vespoli | |
| 7,552,695 | B1 | 6/2009 | Matsueda et al. | |
| 7,856,904 | B2 | 12/2010 | Lin | |
| D636,564 | S | 4/2011 | Matsueda et al. | |
| 8,015,936 | B2 | 9/2011 | Sakaue et al. | |
| 8,141,274 | B2 | 3/2012 | Matsueda | |
| 8,245,597 | B2 | 8/2012 | Lin | |
| 8,458,926 | B2 | 6/2013 | Ewans | |
| 9,027,502 | B2 | 5/2015 | Strickland, Jr. | |
| 9,714,076 | B2 | 7/2017 | Strickland, Jr. | |
| 2003/0051576 | A1* | 3/2003 | Muraoka | B62M 3/086 74/594.6 |
| 2006/0183385 | A1 | 8/2006 | Kaufer | |
| 2009/0205556 | A1 | 8/2009 | Kawahara et al. | |
| 2010/0005924 | A1 | 1/2010 | Servignat et al. | |
| 2010/0325920 | A1 | 12/2010 | Ewans | |
| 2011/0143607 | A1 | 6/2011 | Toth | |
| 2011/0152041 | A1 | 6/2011 | Francis | |
| 2011/0315066 | A1* | 12/2011 | Matsueda | B63H 16/02 114/363 |
| 2012/0066934 | A1 | 3/2012 | West | |
| 2013/0186232 | A1 | 7/2013 | Servignat et al. | |
| 2014/0260785 | A1 | 9/2014 | Bryne | |
| 2014/0299037 | A1* | 10/2014 | Strickland, Jr. | A63B 5/08 114/363 |
| 2017/0106957 | A1 | 4/2017 | Schauble et al. | |

FOREIGN PATENT DOCUMENTS

| | | | | |
|---|---|---|---|---|
| FR | 2556687 | A1 * | 6/1985 | |
| FR | 2695902 | A1 * | 3/1994 | B62M 3/086 |
| GB | 2202499 | A * | 9/1988 | B62M 3/086 |

OTHER PUBLICATIONS

Clicko approved by FISA, BR Technik, May 18, 2014, http://www.clicko.ch/en/news/?id=16, 1 page.

* cited by examiner

RELEASABLE SHOE FASTENING DEVICE

CROSS-REFERENCE TO RELATED APPLICATIONS

This application is a U.S. National Stage Application under 35 U.S.C. § 371 of International Application No. PCT/US2022/021831, filed Mar. 24, 2022, which claims the benefit of U.S. Provisional Patent Application No. 63/165,449, filed Mar. 24, 2021, each of which are incorporated herein by reference in their entireties.

BACKGROUND

Various sporting activities may sometimes involve temporarily securing a shoe to a support. In just one example, a rower athlete may releasably secure their feet, via a shoe, relative to a support of a boat. On the one hand, the athlete rower seeks a stable platform for their feet and legs, from which they may initiate, drive, and/or augment various rowing actions (e.g. pulling, return) with their arms without their feet becoming unintentionally or inadvertently dislodged from the support of the boat. On the other hand, the rower desires confidence to be able to readily release their feet (within shoes) from the boat as desired or needed.

DETAILED DESCRIPTION

Figure 1:
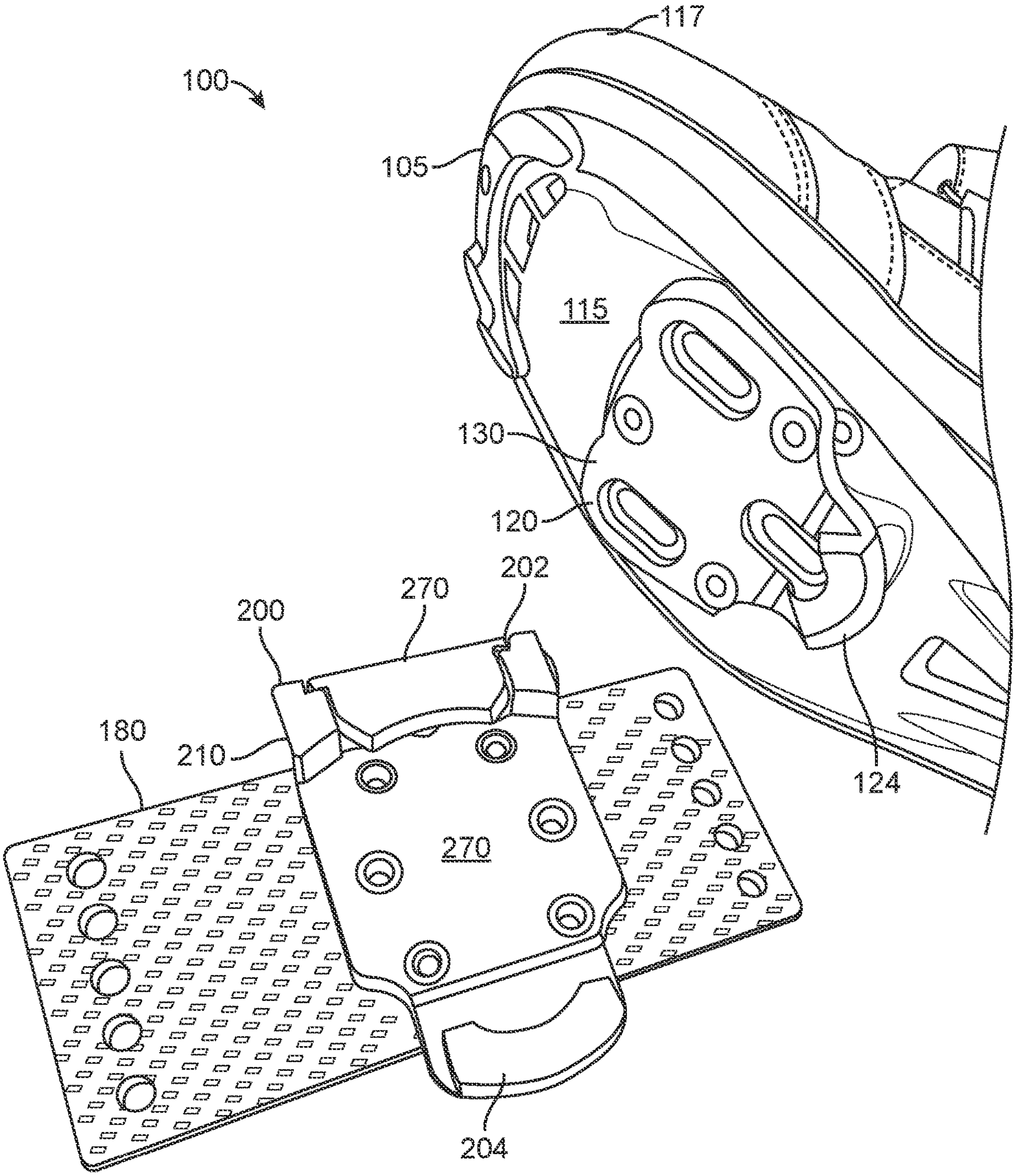
FIG. 1 is a schematic representation including a top view of an example receiver mounted on a support and a perspective view of a cleat mounted on a shoe.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

At least some examples of the present disclosure are directed to arrangements by which a shoe may be releasably mounted relative to a support. In some such examples, the support may form a portion of, or be mounted to, another structure, such as a vehicle, boat, exercise machine, bike, etc. In some such examples, the support may form a portion of (or be mounted to) a rowing boat and the shoe worn by a rower. Similarly, the support may form part of, or be mounted to, a rowing-type exercise machine.

In one example implementation of such an arrangement, a cleat forms part of, or is mounted to, a sole of shoe while a receiver forms part of, or is mounted to, a support, such as one of the above-mentioned example supports. The cleat is releasably mountable relative to the receiver thereby enabling the shoe to be releasably mountable relative to the support.

In at least some example implementations of the above-described arrangement, the following sequence of actions may occur.

For instance, in order to releasably mount the shoe relative to a support, the user may begin to step into the support, such as via positioning the shoe such that a rear portion of the cleat is slidably received into a slot portion of a receiver which is followed by the user causing the front portion of the cleat to become removably retained relative to a biased clip pivotally mounted relative to a frame of the receiver. In particular, in some examples, with the rear portion of the cleat removably retained via the slot in the rear portion of the receiver, the front portion of the cleat is pressed directly downward into contact against a front edge of the clip. The rotational force of this downward pressing action (of the front portion of the clip) temporarily overcomes the biasing force acting on the clip, thereby causing the clip to pivot in a first orientation which permits the front portion of the cleat to slide downward past a front edge of the clip. In response, the biasing force acting on the clip causes the front edge of the clip to pivot in a second reverse orientation back toward the front portion of the cleat such that the front edge of the clip returns to a position in which the front edge of the clip presses downward on the front portion of the cleat. This downward pressing action of the front edge of the clip forcibly removably retains the front portion of the cleat within, and relative to, the receiver.

In some examples, a catch element may take the role of the clip with the catch element comprising at least some of substantially the same features as the clip while also comprising some different features and attributes, as further described below.

It will be understood that the size, shape, position, and orientation of various components of the receiver frame, clip (with biasing force), and cleat of the shoe provide a relationship which acts to retain the cleat within, and relative to, the receiver during normal use of the shoe in its secured position within the receiver. For example, during rowing a user will cyclically: (1) exert a downward pressing force on the receiver and support, via their shoe, as the user pushes with their legs against the support during a pulling movement of oars (or pulling of handles of a resistance mechanism); and (2) exert an upward pulling force relative to the clip and receiver frame, via their shoe, as the user pulls with their legs relative to the support during a return of the oars back to starting position before the user initiates the next pulling action.

During the exertion of the upward pulling force of the cleat (and front portion of the shoe) relative to the clip, the biasing force (given the particular size, shape, position, and orientation of the clip relative to the receiver frame) is greater than the upward pulling force exerted by the user via their shoe so that the user can confidently perform these actions without fear that the cleat of their shoe would become inadvertently and unintentionally released by the clip and receiver frame.

However, the combination of the clip, receiver frame, biasing force, and cleat are also arranged to permit the user to readily remove their cleat (and therefore the entire shoe) from retention by the receiver (i.e. clip, receiver frame, and biasing force) when a user so desires. In some such examples, the user may initiate such removal of the cleat (and therefore the shoe) via forcibly twisting the front of their shoe in a lateral rotational movement relative to the receiver and support. This forcible twisting movement causes the front portion of the cleat to exert a lateral force against, and sliding movement relative to, portions of the front edge of the clip. This lateral force is of a magnitude sufficient to overcome the biasing force on the clip such that the clip pivots upward and back away from the front portion of the cleat, by a distance and in an orientation, sufficient for the front portion of the cleat to slide underneath the front edge of the clip with the front edge of the clip still pressing generally downward against, and on top of, the front portion of the cleat.

With continued lateral rotational movement of the cleat, as forced by the user's shoe, the front portion of the cleat continues to slide underneath and relative to the front edge of the clip with the downward biasing force of the clip still retaining the front portion of the cleat within, and relative to, the receiver frame.

Simultaneously during this action, in some examples, a flange of a rear portion of the cleat slidably rotates within the slot of the rear portion of the receiver frame which continues until a front portion (e.g. sloped vertex portion) of a footing of the rear portion of the cleat slidably contacts a transition portion of the base of the receiver frame. This contact with the transition portion then causes the base of the cleat to pivot upward away from the base of the receiver frame, as the cleat becomes dislodged from the receiver. At the general point at which the front portion of the footing (of the rear portion) of the cleat makes this slidable contact with the transition portion (e.g. ridge) of the base of the receiver frame, the front portion of the cleat has become rotated relative to the front edge of the clip (and relative to the front portion of the receiver frame) such that a rounded corner portion of the front portion of the cleat has become positioned adjacent a central recessed portion of the front edge of the clip. Upon reaching this position, the front portion of the cleat may readily move upward, away, and out of retention from the front edge of the clip generally simultaneous with the above-described exiting of the rear portion of the cleat out, and away from, the rear receiving portion of the receiver frame.

However, in some examples a footing of the rear portion of the cleat comprises a size and/or shape and the receiver frame comprises a size and/or a shape to receive the footing in a manner to be slidably rotatably movable even during rotation by the user in an intended maneuver to release the cleat from the receiver. In such example arrangements, the receiver is shaped and sized such that the rotation of the footing does not result in its forcible engagement of a ridge of a rear portion of a base of a receiver. Instead, in these examples, the footing is retained within the slot portion of the rear portion of the receiver (and within a recessed contact portion), as the front portion of the cleat continues being lateral rotated outward until the front portion escapes contact from the front edge of the catch element (and its associated downward and pushing biasing force). Upon such escape the front portion of the cleat may be further rotated laterally and/or moved vertically upward away from the receiver, with the footing of the rear portion of the cleat being slidably moved forward out of the slot portion (of the rear portion) of the receiver, resulting in the entire cleat being become free and disengaged relative to the receiver, allowing the user to remove their foot and shoe from the device.

In at least some aspects of the above-described example implementations, the combination of the cleat, biased clip (or catch element in some examples), and receiver frame act together to provide an arrangement by which a user may readily “step into” the receiver to secure their shoe relative to the support and be confident in the robust manner by which the example arrangement maintains the shoe securely relative to the support during a rowing activity or other robust activity. Similarly, the example arrangement also ensures that the user may confidently and quickly cause their shoe to become released relative to the support when the user desires to “step out of” the receiver. At least because the example arrangement of the cleat, biased clip, and receiver frame exhibit symmetry along a longitudinal axis of the example arrangement, the same example arrangement may be used interchangeably for either the left or right shoes. Moreover, a user may initiate a lateral escape in either a left or right direction for either the left shoe or the right show.

In some examples, at least some components of the example arrangement, such as at least the cleat, clip (or catch element in some examples), and/or receiver frame may be comprise a polymer material. In some such examples, these components may be formed via additive manufacturing (e.g. 3D printing). It will be understood that the polymer material may exhibit sufficient hardness, toughness, and resilience to withstand the various forces typically exerted on such components during mounting of the shoe into the receiver, during rowing (or other activity), and/or during removal of the shoe from the receiver.

These examples, and additional examples, are further described and illustrated in association with at least FIGS. 1-23.

Figure 4A:
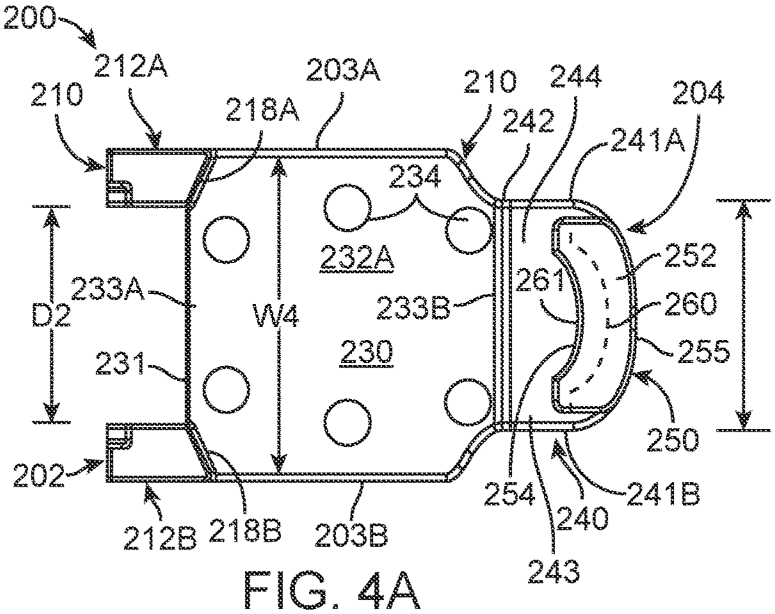
FIGS. 4A and 4B are top and side plan views, respectively, schematically representing an example receiver frame.
Figure 4D:
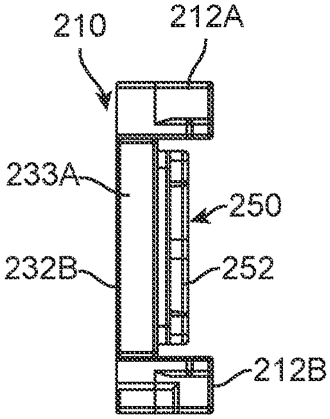
FIGS. 4C and 4D are perspective and end views, respectively, schematically representing an example receiver frame.
Figure 4B:
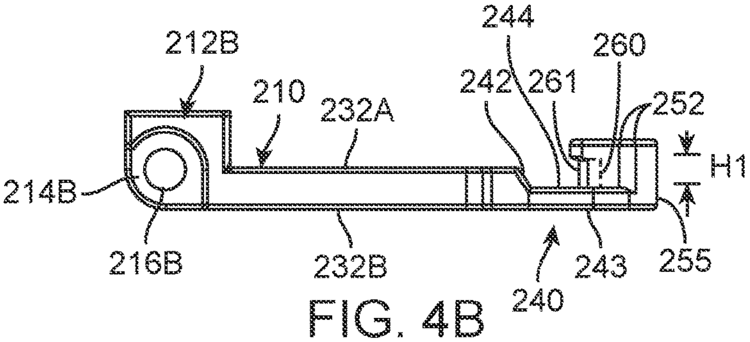
Figure 4C:
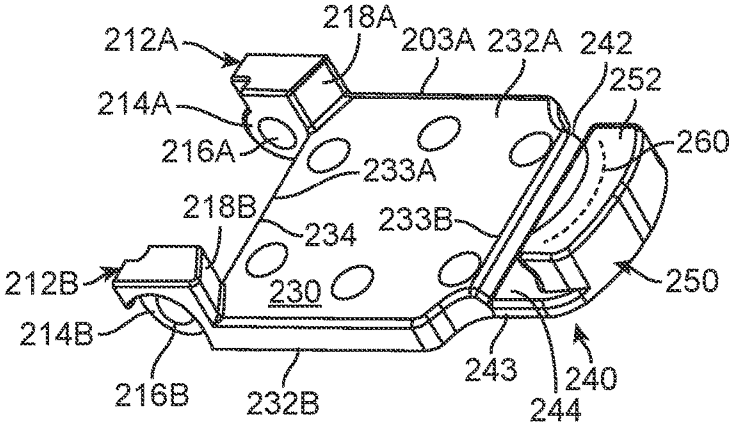

FIG. 1 is a perspective view including a diagram schematically representing an example releasable fastening arrangement 100 (and/or example method) comprising a cleat 120 and a receiver 200 by which a shoe 105 may become releasably secured relative to a support 180. The cleat 120 may be mountable relative to, or form part of, a sole 115 of shoe 105. In some instances, the cleat 120 is located at a ball portion of the sole 115 but may be located in other positions in some examples. In some examples, the cleat 120 comprises a first portion 130 and an opposite second portion 124. Meanwhile, the receiver 200 comprises a frame 210, which extends between a first end 202 and opposite second end 204. The receiver 200 also may comprise a clip 270 pivotally mounted relative to first end 202 of frame 210, while the second end 204 of the frame 210 may comprise a housing 250 including a slot portion 260 (FIG. 4A-4C).

Figure 2:
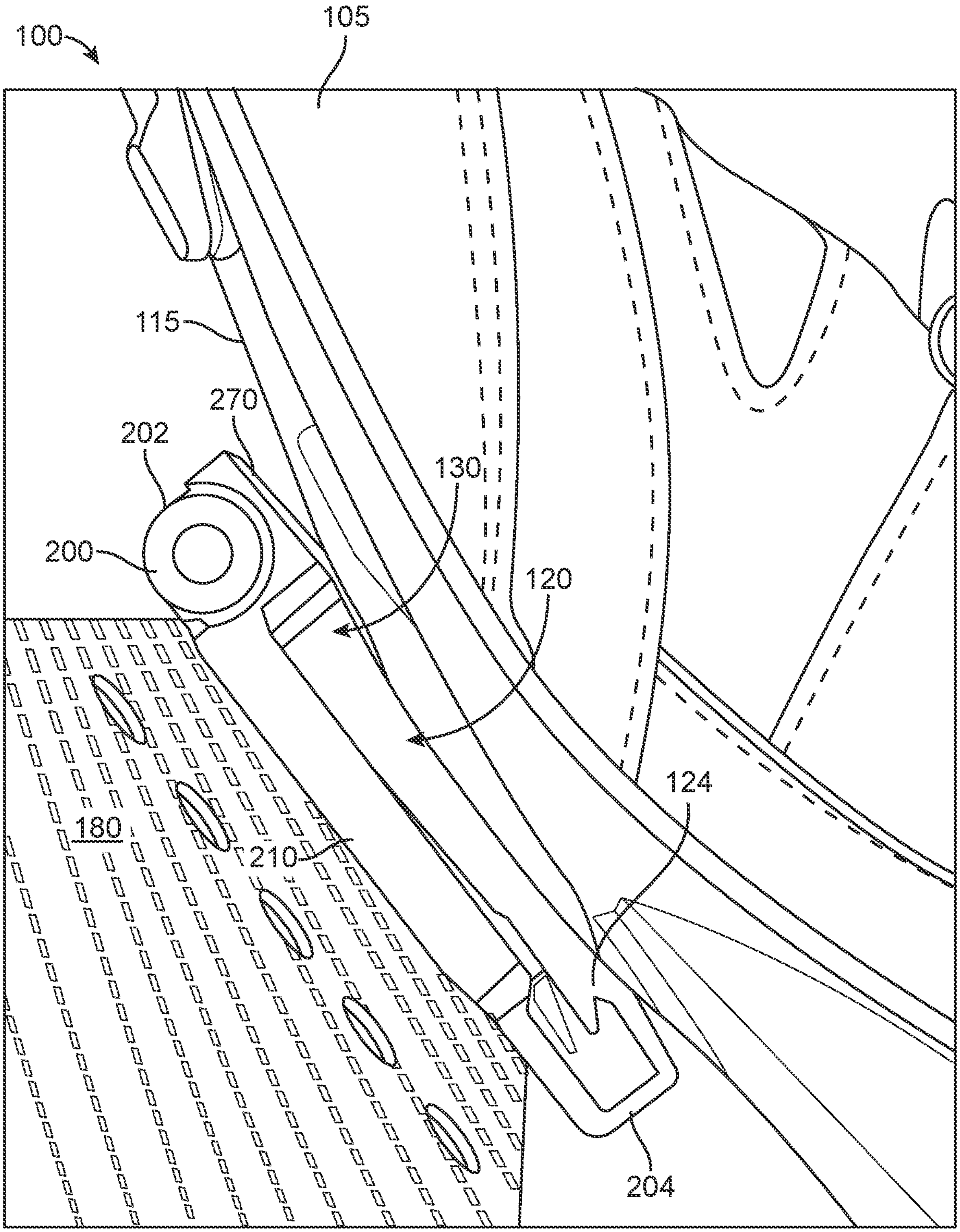
FIG. 2 is a side view schematically representing an example cleat, mounted on a shoe, as releasably retained within an example receiver, mounted on a support.

FIG. 2 is a side view schematically representing the releasable fastening arrangement 100 in a state in which the shoe 105 is releasably fastened relative to the support 180 via the cleat 120 and receiver 120. For example, in general terms, the second portion 124 (e.g. rear portion) of the cleat 120 is slidably engaged into the slot portion 260 of the receiver frame 210 while the front portion 130 of the cleat 120 is releasably captured by the clip 270 and receiver frame 210.

With this general arrangement in mind, the details of each of the various components of the releasable fastening arrangement 100 will be further described below as well as their relationship and operation relative to each other.

FIGS. 3A-3D are diagrams schematically representing the example cleat 120. In some examples, the cleat 120 comprises at least some of substantially the same features and attributes as cleat 120 in FIGS. 1-2 and/or may be an example implementation of the cleat 120 in FIGS. 1-2.

Figure 3A:
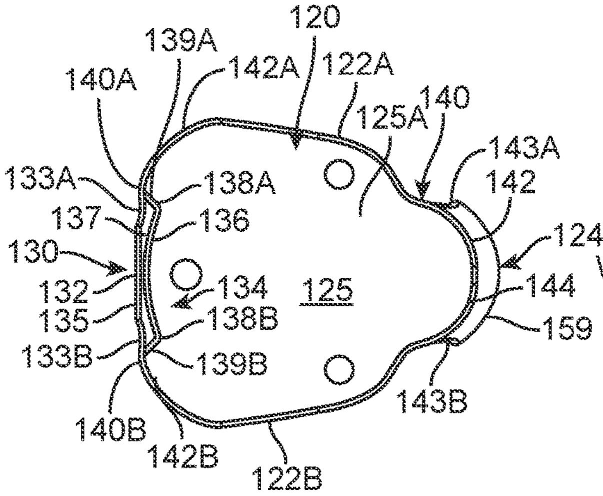
FIGS. 3A and 3D are top and bottom plan views, respectively, schematically representing an example cleat.

As shown in at least the top plan view of FIG. 3A, cleat 120 comprises body 125 having a top surface 126A, an opposite bottom surface 126B (FIGS. 3B-3D), and opposite sides 122A, 122B. In some examples, the top surface 126A may be sized and shaped (e.g. concave) to complement a size and shape (e.g. convex) of the sole 115 of shoe 105, as shown in FIGS. 1-2.

Cleat 120 also comprises first portion 130 (e.g. front portion) and an opposite second portion 124 (e.g. rear portion) at opposite ends of the body 125. As further shown in FIGS. 3A, 3C, the front portion 130 comprises a recess 134 defined, at least, by a front edge 132, ledge 137, and wall 136. The front edge 132 may comprise a straight portion 135 extending between spaced apart recesses 133A, 133B, which may sometimes be referred to as scalloped portions. Recess 134 may be further defined by opposite edge portions 139A, 139B, which may comprise wall portions joined to wall 136 via junctions 138A, 138B, respectively. In some examples, each respective junction 138A, 138B may comprise a V-shaped recess as shown in at least FIGS. 3A-3C. In addition, opposite outer ends of the first edge 132 and the outer edge portions 139A, 139B of the recess 134 may form junctions 140A, 140B. As further shown in at least FIG. 3A, 3C, the cleat 120 includes rounded front corners 142A, 142B, which in some instances may be considered to form part of the front portion 130 of the cleat 120.

Figure 3D:
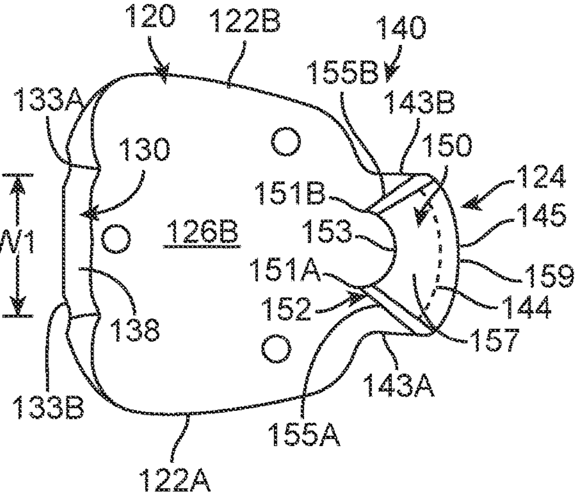
Figure 3B:
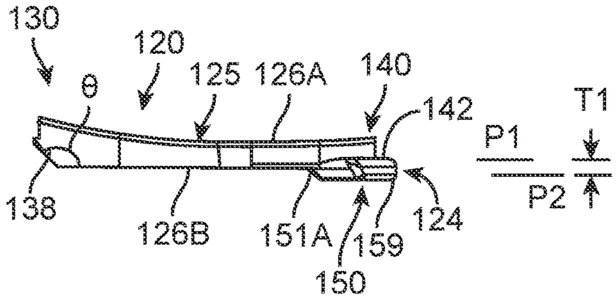
FIGS. 3B and 3E are side and end views, respectively, schematically representing an example cleat.
Figure 3E:
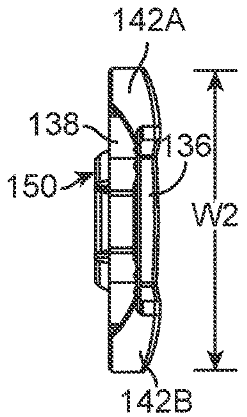

As further shown in FIGS. 3B, 3D, the front portion 130 of the cleat 120 comprises a bottom beveled portion 138, which defines a surface which extends rearwardly from the front edge 132 and forming an angle (θ) relative to the bottom surface 126B of the body 125 of the cleat 120.

Figure 3C:
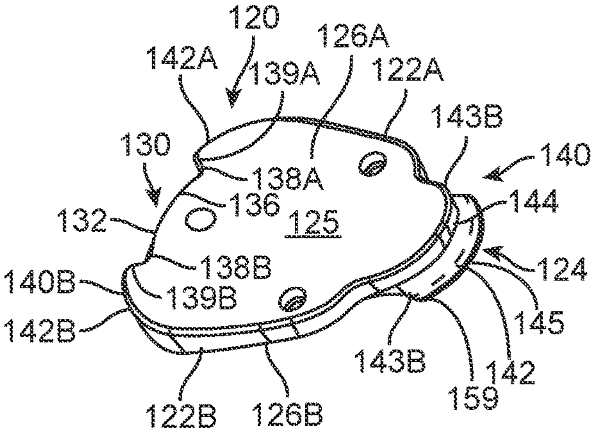
FIG. 3C is a perspective view schematically representing an example cleat.
Figure 3F:
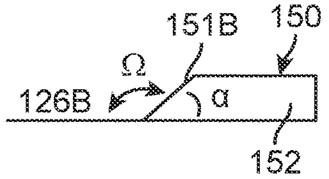
FIG. 3F is a diagram schematically representing an angle associated with an example flange of a cleat.

As further shown in at least FIGS. 3A-3C, in some examples the rear portion 124 of the cleat 120 may comprise a semi-circular shaped extension 140 forming part of body 125 and having a width W1 which is substantially narrower (e.g. 30%, 40%, 50%, etc.) than a width W2 of the front portion 130 of the cleat 120. This extension 140 may sometimes be referred to as rear extension 140. As seen in the top plan view of FIG. 3A, the rear extension 140 of cleat 120 also may comprise a flange 142 which extends outwardly and rearwardly from a rear edge 144 of body 125, with flange 142 extending in a second plane (P2 in FIG. 3B) which is offset relative to a first plane P1 (FIG. 3B) through which the rear portion of the body 125 (in rear extension 140) extends. In some examples, the flange 142 has a width generally corresponding to the width W1 of the rear base extension 140. As will be further illustrated later in at least FIG. 3B, the flange 142 has thickness T1 which generally corresponds to a height (e.g. H1 in FIG. 4B) width of slot portion 260 defined at the rear portion 240 of the receiver frame 210.

With further reference to FIGS. 3A-3D, in some examples the rear body extension 140 also may comprise a footing 150. A second end/portion 159 of the footing 150 forms a portion of the flange 142, while an opposite first portion 152 of the footing 150 extends forward, e.g. toward the first portion 130 of the cleat 120. As later shown and further described in association with at least FIGS. 7B, 12A, the various components of footing 150 are sized, shaped, and positioned to selectively engage various structures (e.g. 244, 242, 260) of the receiver frame 210.

As further shown in FIGS. 3B and 3D, the footing 150 comprises a body portion 157 extending between a pair of outer edges 155A, 155B and a centrally located edge portion 153, which extends between the respective edges 155A, 155B at first end/portion 152. In some examples, the edge portion 153 may comprise a recessed, concave shape. In some example, first end/portion 152 of the footing 150 also may comprise a pair of sloped, vertex portions 151A, 151B formed at, and as, a junction between the concave edge portion 153 and the respective edges 155A, 155B. As further shown in the side view of FIG. 3E and FIGS. 12A-12B, each vertex portion 151A, 151B also forms an angle (Ω) relative to the bottom surface 126B of the cleat 120, which also may be referenced via the complementary angle (α). In some such examples, angle α may be between about 20 and about 70 degrees, while in some examples, angle α may be between about 30 and 60 degrees, and in some examples, angle may be between about 40 and 50 degrees. As later shown and further described in association with at least FIGS. 7B, 12A-12B, the sloped, vertex portions 151A, 151B of first end/portion 152 of footing 150 are sized and shaped to slidably and/or rotatably engage surfaces (e.g. 242 of the transition portion 244) of the receiver frame 210 in order facilitate selective exit of the cleat 120 from the receiver 200.

FIGS. 4A-4C, 5 are diagrams which schematically represent an example receiver 200, including receiver frame 210 and clip 270. In some examples, the receiver 200 comprises at least some of substantially the same features and attributes as receiver 200 in FIGS. 1-2 and/or may be an example implementation of the receiver 200 in FIGS. 1-2. As shown in at least FIGS. 4A-4B, in some examples receiver frame 210 may comprise a base 230 having a first surface 232A (e.g. upper surface) and opposite second surface 232B (e.g. lower surface). The first surface 232A may act as a primary surface to support the second surface portion 126B of the base 125 of cleat 120, as shown in FIGS. 1-2, when the cleat 120 is releasably secured within and relative to the receiver 200. Meanwhile, as further shown in FIG. 4A, the opposite second surface 232B of the base 230 may act as a primary surface to be secured against a support, such as support 180 as shown in at least FIGS. 1-2. Moreover, the base 230 may comprise a plurality of holes 234 to facilitate use of fasteners to secure the receiver frame 210 relative to the support 180.

Figure 5:
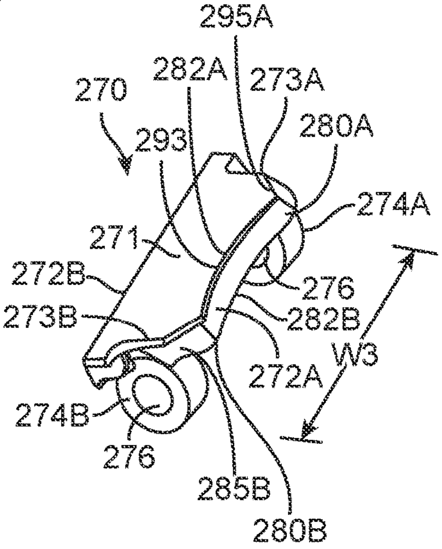
FIG. 5 is a perspective view, respectively, schematically representing an example clip of a receiver.

As further shown in FIG. 4A, the base 230 may comprise a first end 233A from which a pair of protrusions 212A, 212B extend forwardly from the base 230, with protrusions 212A, 212B spaced apart by a distance D2, with each protrusion 212A, 212B located adjacent a respective side edge 203A, 203B of the base 230. The distance D2 may correspond to a width W3 of the clip 270, as shown in FIG. 5 such that the protrusions 212A, 212B are spaced apart by a distance suited to slidably receive the clip 270 therebetween. As further shown in FIG. 4A, 4B, 4C, each protrusion 212A, 212B comprises a panel 214A, 214B, respectively with each panel 214A, 214B defining a respective hole 216A, 216B. The holes 216A, 216B are sized to receive a pin, such as pin 310 which is further described later in association with at least FIGS. 6A-6B.

As further shown in FIGS. 4A-4C, the first end 233A of the base 230 of receiver frame 210 defines an edge 231 which extends between the respective protrusions 212A, 212B. Moreover, each protrusion 212A, 212B comprises a respective contact portion 218A, 218B which faces inwardly toward base 230 and which is sized, shaped, and oriented to slidably receive at least the respective rounded corners 142A, 142B of the cleat 120. Interaction between the contact portions 218A, 218B and the respective rounded corners 142A, 142B of the cleat 120 are further described later in association with at least FIGS. 6C, 10A, 10C.

With further reference to FIGS. 4A-4C, the base 230 of the receiver frame 210 comprises a width W4, which corresponds to a greatest lateral dimension (W2) of the base 125 of the cleat 120.

As further shown in FIGS. 4A-4C, in some examples, the body 230 of the receiver frame 210 comprises a second/rear edge 233B from which extends a rear receiving portion 240. In some examples, at least a portion of the junction 242 of the rear receiving portion 240 and of the rear edge 233B of the body 230 may comprise a beveled surface which forms an angle (λ) which may be complementary relative to the angle (α) of the vertex portions 151A, 151B of the footing 150 of the cleat 120, as further shown and later described in relation to at least FIGS. 7B, 12A, 12B, 13. The beveled surface of the junction 242 may facilitate slidable movement of the vertex portion 151A, 151B of the first end/portion 152 of footing 150 upon selective exiting of the cleat 120 from the receiver 200, as further described later in association with at least FIGS. 12A, 12B, 13.

As further shown in FIGS. 4A-4C, in some examples the rear receiving portion 240 may comprise a platform 241A, 241B which extends rearwardly from the junction 242 and which defines, among other things, a contact member 244 against which the footing 150 of the cleat 120 may be supported. The platform 241A, 241B also supports a housing 250, which defines (at least) a slot 260 sized, shaped, and oriented to slidably receive the flange 142 and rear portion of the footing 150 of the cleat 120, as further described and shown in association with at least FIGS. 7A, 7B, 12A. As shown in at least FIG. 4B, the slot 260 is accessible via an opening 261 defined in an inner end 254 of the housing 250, while an outer end 255 of the housing 250 is closed and generally defines an end 204 of the receiver frame 210.

FIG. 5 is a diagram, including a perspective view, schematically representing an example clip 270, which forms part of the receiver 200. In some examples, the clip 270 shown in FIG. 5 may comprise at least some of substantially the same features and attributes as clip 270 in FIGS. 1-2 and/or may be an example implementation of the clip 270 in FIGS. 1-2.

As shown in FIG. 5, the clip 270 may comprise an elongate member 270 (e.g. plank-like member) extending between opposite ends 273A, 273B, with each opposite end 273A, 273B supporting a respective flange 274A, 274B. Each respective flange 274A, 274B comprises a hole 276 sized, shaped, and aligned to slidably receive a pin 310 as shown later in FIGS. 6A-6B. As shown in FIG. 5, the respective flanges 274A, 274B are spaced apart from each other by a distance (W3) substantially the same as the distance D2 between the protrusions 212A, 212B of the receiver frame 210, such that the clip 270 is slidably receivable between the protrusions 212A, 212B of the receiver frame 210, as further shown in at least FIGS.

Figure 6A:
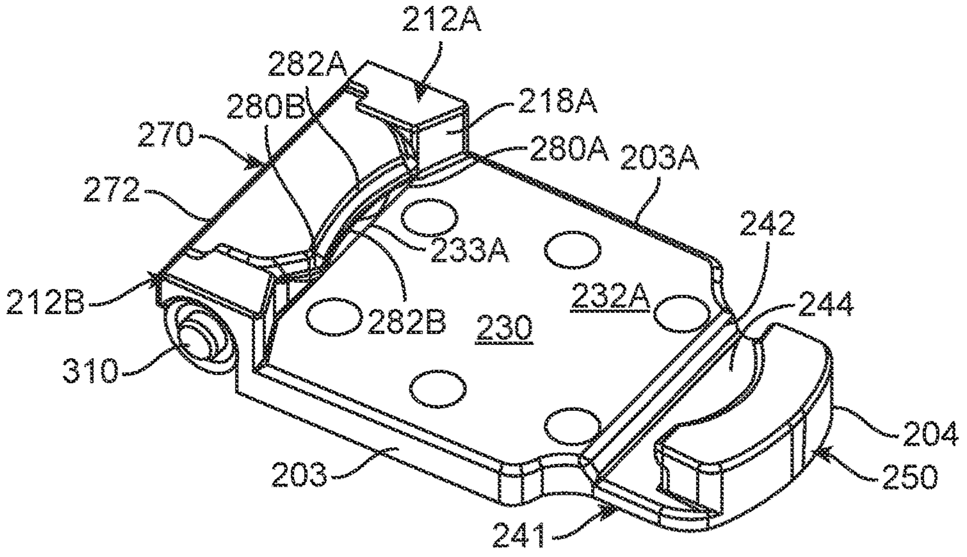
FIGS. 6A and 6B are perspective views, respectively, schematically representing an example receiver including a clip pivotally mounted relative to a receiver frame.

6A-6B. As further shown in at least FIG. 6B, the pin 310 has a length sufficient to extend through length of the clip 270 (including through the hole 276 of the respective flanges 274A, 274B) and through the hole 216A, 216B of the protrusions 212A, 212B of the receiver frame 210. Via the pin 310, the clip 270 becomes secured between, and pivotally movable relative to, the protrusions 212A, 212B of the receiver frame 210 with both FIGS. 6A and 6B depicting the clip 270, pin 310, and receiver frame 210 in an assembled relationship.

Figure 6B:
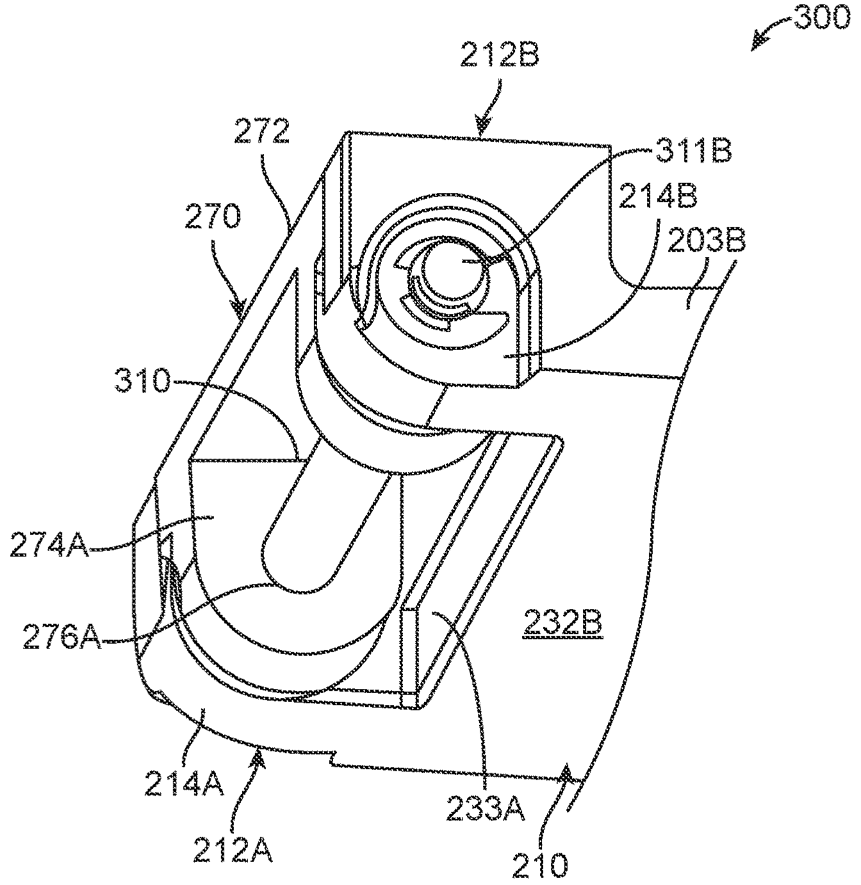

While not shown in FIG. 6B for illustrative clarity, it will be understood that a spring or other element may be mounted on or relative to the pin 310, clip 270, and/or first end 233A of receiver frame 210 in order to provide a biasing force acting on the clip 270 to control a range of motion, direction of pivotal rotation, etc. of the clip 270 relative to the first end 233A of the receiver frame 210. Several FIGS., such as FIGS. 9A-9C, 10B, depict the action of such biasing force and/or other rotational forces acting counter to the default biasing force RF1 acting on clip 270. In some examples, the biasing force and structure of the spring (relative to the clip 270 and receiver frame 210) are arranged to cause the clip 270 to have at least: (1) a default, resting position as shown in at least FIG. 6A. 6B, 8A, 9A prior to the cleat 120 being removably secured within (e.g. relative to) the receiver 200; (2) a dynamic position shown in at least FIGS. 9B, 11A, 11B in which the cleat 120 is either being inserted into, or being removed from the receiver 200; (3) an in-use, securing position as shown in at least FIGS. 1B, 9C, 10B in which the cleat 120 is secured within the receiver 200; or (4) positions between the above-identified positions as when the clip 270 is moved between the resting position, dynamic positions, and securing position.

Figure 6C:
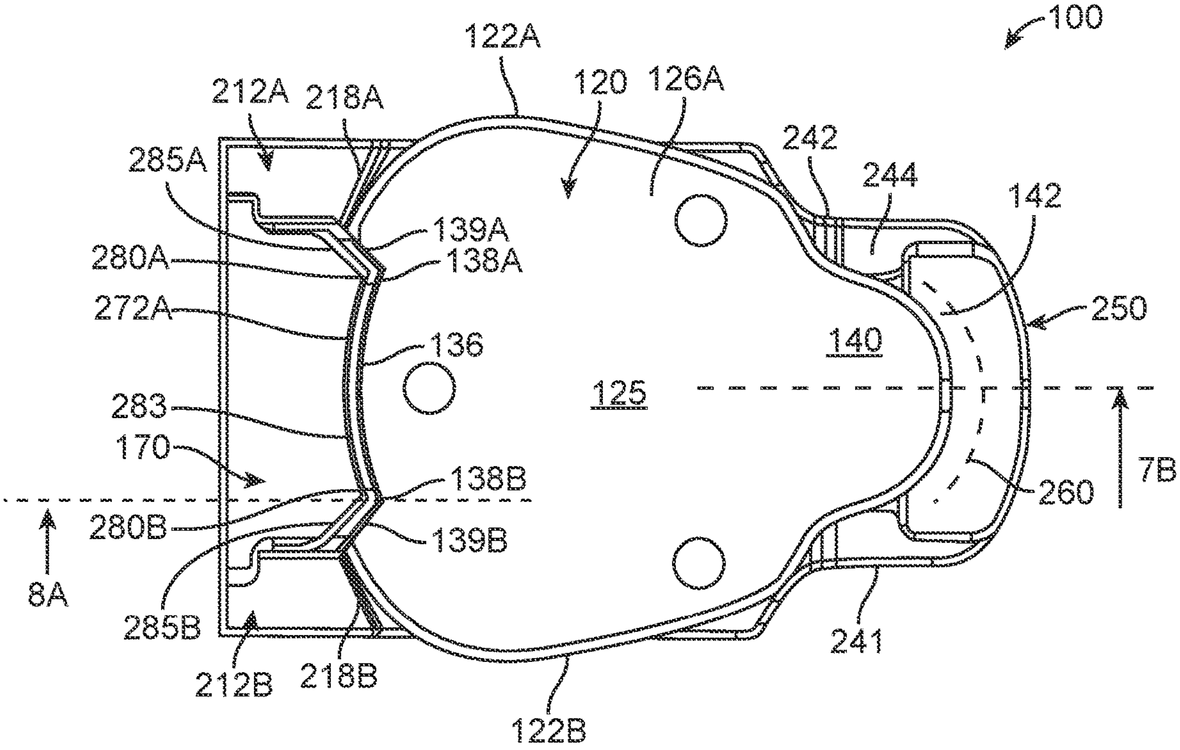
FIG. 6C is a top plan view schematically representing an example releasable fastening device including an example cleat releasably retained within and by an example clip and example frame of a receiver.

FIG. 6C is a diagram, including a top plan view, schematically representing an example releasable fastening arrangement 100 and depicting cleat 120 releasably mounted relative to receiver 200. While FIG. 6C omits the presence of shoe 105 (FIG. 1) for illustrative clarity, it will be understood that ordinarily the cleat 120 would be secured relative to shoe 105 as shown in FIG. 2 prior to the cleat 120 being releasably retained relative to the receiver 200, which ordinarily would be secured relative to a support (e.g. 180 in FIGS. 1-2).

As shown in FIG. 6C, the rear extension portion 140 of the cleat 120 is removably retained relative to at least the slot 260 of housing 250 of receiver frame 210 and the front portion 130 of the cleat 120 is removably retained relative to at least the front edge 272A of clip 270. Further details regarding the more particular interaction of the various components of the cleat 120 and receiver 200 are provided below in association with at least FIGS. 7B-13 in the context of inserting and removing the cleat 120 relative to the receiver 200.

Figure 7A:
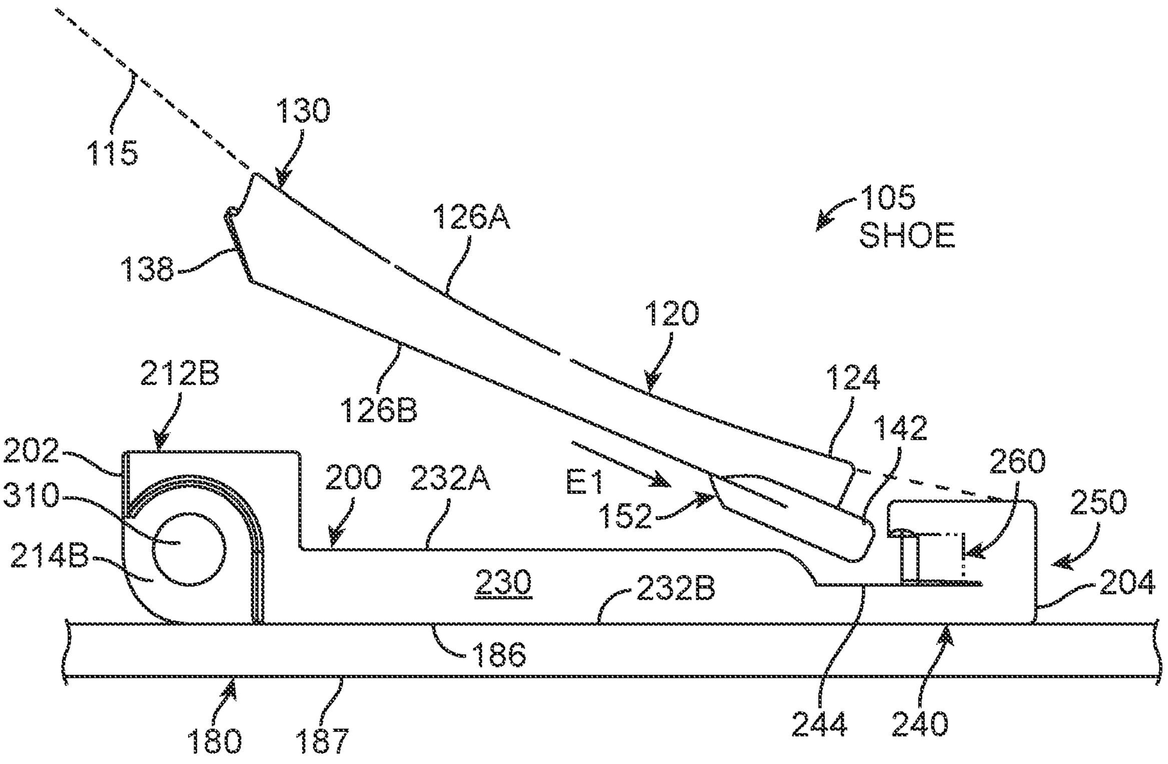
FIGS. 7A and 7B are side views schematically representing a rear portion of an example cleat being inserted into a rear receiving portion of an example receiver frame.

For instance, in some examples, as shown in the side view of FIG. 7A, securing the cleat 120 relative to receiver 200 may begin via inserting the flange 142 (of rear extension portion 140) of cleat 120 into the slot 260 of housing 250 of receiver frame 210, as represented by directional arrow E1. It will be understood that this action generally corresponds with a first part of a user "stepping into" the receiver 200, beginning with insertion of the rear portion 140 of the cleat 120 relative to the rear portion 240 of the receiver frame 210.

Figure 7B:
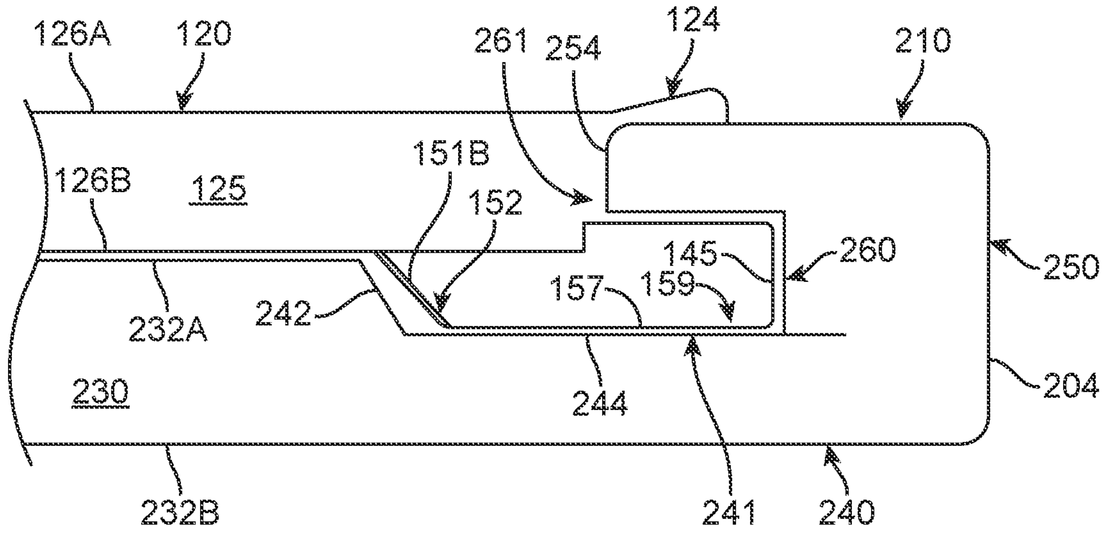

Upon complete insertion of flange 142 into slot 260, and further later actions of removably retaining the front portion 130 of cleat 120 relative to at least front edge 272A of clip 270 (e.g. associated with the user pressing downward with the front portion 130 of the cleat 120), the rear extension 140 of the cleat 120 will become fully seated relative to receiver 200 as shown in FIG. 7B.

In particular, FIG. 7B provides a sectional side view as taken along line 7B in FIG. 6C and which schematically represents the flange 142 (of the rear extension portion 140) of the cleat being removably, slidable retained within the slot 260 of the housing 250 of the receiver frame 210 along with the footing 150 (of the rear extension portion 140) of cleat 120 in removably secured contact against the contact portion 244 of the platform 241 (of the rear portion 240) of the receiver frame 210.

With the understanding that the flange 142 of the cleat 120 is nearly fully inserted (or fully inserted) into the rear receiving portion of the receiver frame 210 as shown in FIG. 7B, the user may press downwardly with the toe portion 117 (FIG. 1) of the shoe 105 to further advance the cleat 120 relative to the receiver 200. This stage of securing the cleat 120 relative to receiver 200 is schematically represented in at least FIG. 8A, which comprises a sectional side view of the cleat 120 being inserted to become removably retained relative to the clip 270.

Figure 8A:
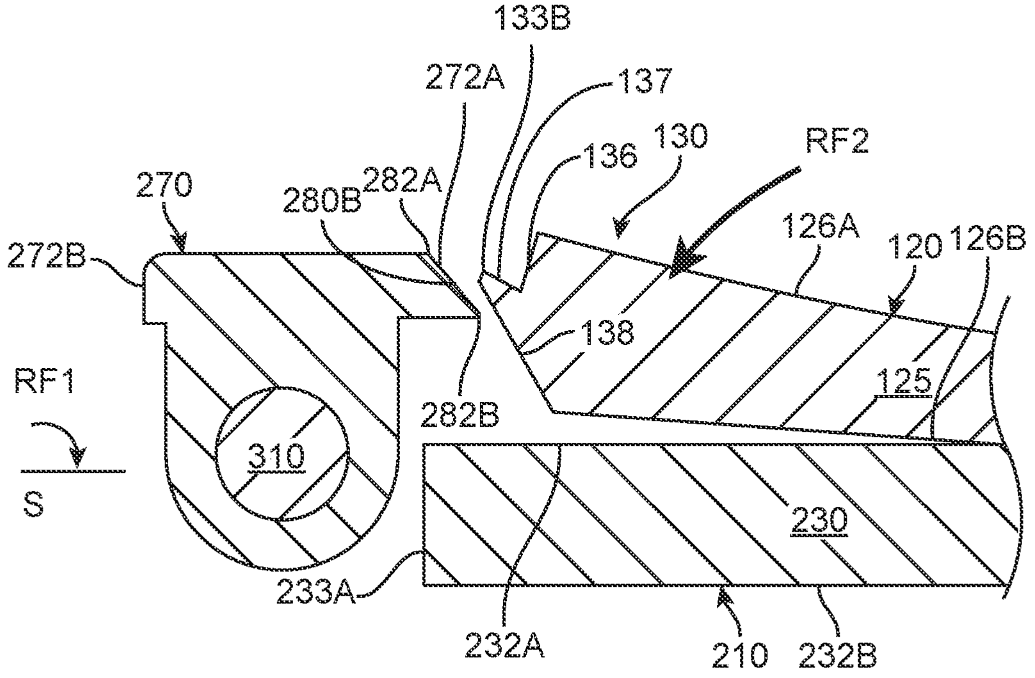
FIGS. 8A and 8B are a side sectional view and top plan view, respectively, schematically representing interaction of a front portion of an example cleat relative to a clip, which is pivotally mounted relative to an example receiver.

As shown in FIG. 8A, in this position, a significant portion of the lower surface 126B of the body 125 of cleat 120 is in pressing contact against the upper surface 232A of the body 230 of the receiver frame 210. Meanwhile, as the front portion 130 of the cleat 120 pivots downward (as represented via directional force arrow RF2) toward receiver 200, the front portion 130 of the cleat 120 approaches the front edge 272A of the clip 270. In the particular sectional view of FIG. 8A, the recessed portion 133B (e.g. scalloped edge) of front portion 130 of cleat 120 approaches the second prong 280B (along front edge 272A) of the clip 270. It will be understood that, at the same time, the recessed portion 133A (e.g. scalloped edge) of front portion 130 will be approaching the first prong 280A (along first edge 272A) of the clip 270. This position is further depicted in the top plan view of FIG. 8B, which shows the two spaced part recessed portions 133A, 133B (e.g. scalloped edges) of the front portion 130 of cleat 120 about to contact the respective first and second prongs 280A, 280B (along the front edge 272A) of the clip 270.

With further reference to FIG. 8A, the recessed portion 133B (of front portion 130) of cleat 120 is about to contact the prong 280B (adjacent the lower edge 282B along front edge 272A) of clip 270.

Figure 9A:
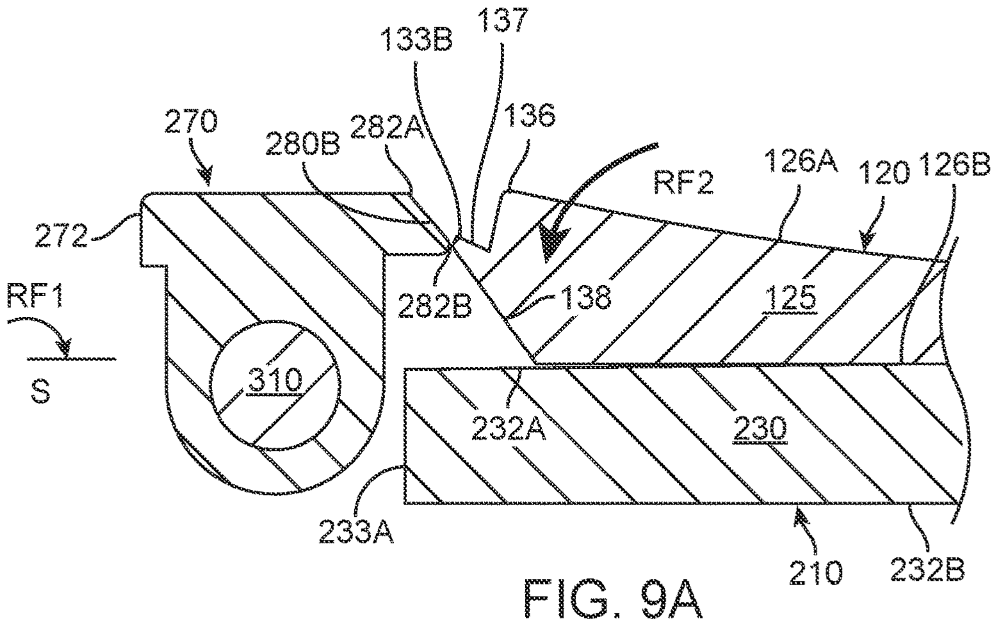
FIGS. 9A, 9B, and 9C are side sectional views schematically representing interaction of a front portion of an example cleat relative to a clip, which is pivotally mounted relative to an example receiver.

As shown in FIG. 9A, with the user pressing the front portion 117 of the shoe 105 rotationally downward (and further downward pressing of the front portion 130 of cleat 120) as represented via the directional force arrow RF2, the recessed portions 133A, 133B of the front portion 130 of cleat 120 make contact adjacent the lower edge 282B of the respective prongs 280A, 280B (along front edge 272A) of the clip 270.

It will be further understood that the depiction of the directional force arrow RF1 in FIGS. 8A, 9A-9C, etc. represents the rotational downward biasing force acting on clip 270 and that the reference line S further represents a limit of rotational downward movement of the clip 270 shown in FIG. 9A. This limit of movement is based, at least in part, on the size, shape, position, and orientation of an element (e.g. a spring) relative to the front edge 233A of the receiver frame 210 and relative to the clip 210.

Figure 9B:
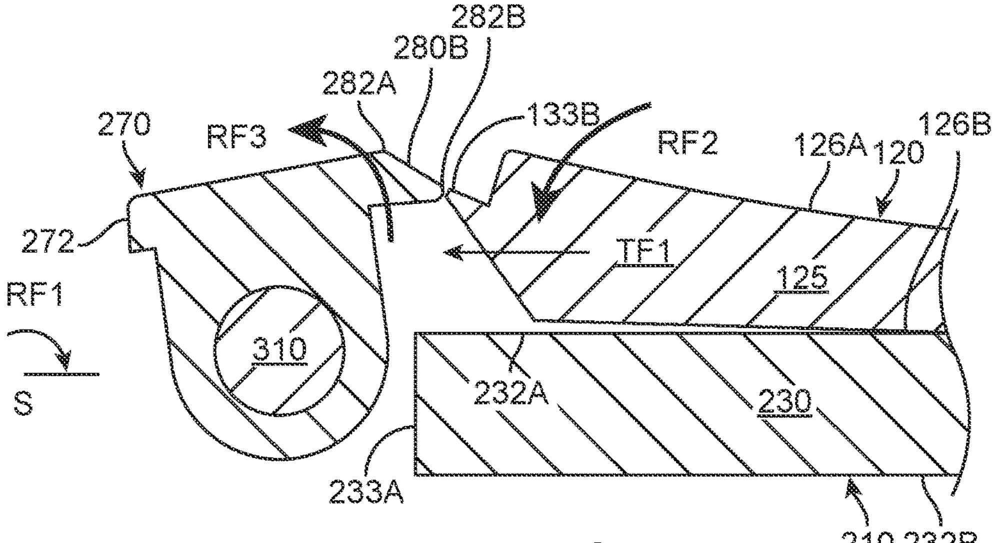
Figure 9C:
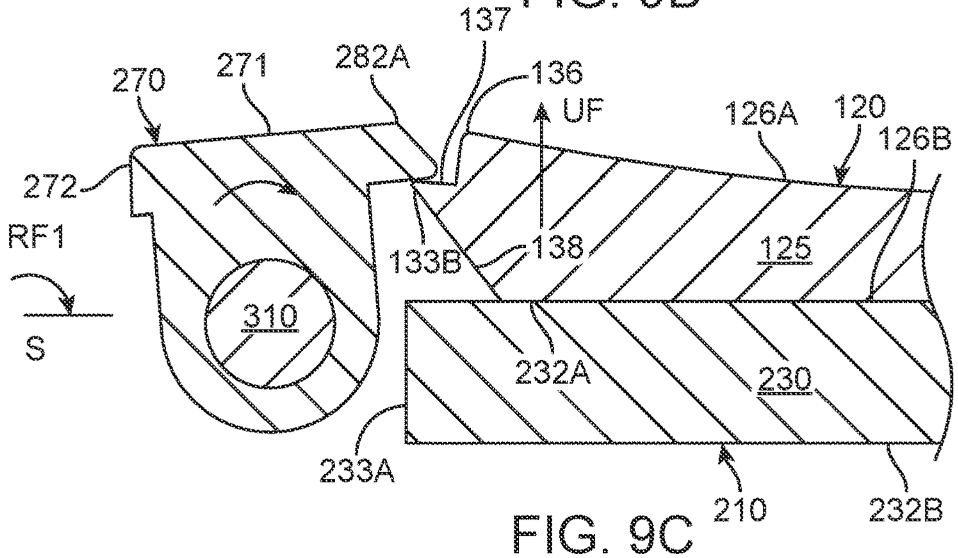

With further reference to FIGS. 9A-9C, upon continued downward pressing of the front portion 117 of the shoe 105 (and therefore further pressing downward motion of the front portion 130 of cleat 120 per directional force arrow RF2), via the respective recessed edges 133A, 133B, the front portion 130 of the cleat 120 creates a force (represented via a directional force arrow TF1) which acts translationally against the front edge 272A of the clip 270 as shown in FIG. 9B. Upon the front edge 272A of the clip 270 receiving this translational force (TF1), which is greater than the translational component of the biasing rotational downward force RF1 already acting on clip 270, the clip 270 pivots upward and away from the front portion 130 of the cleat 120, as shown in FIG. 9B. This action, in turn, permits the recessed edges 133A, 133B (of the front portion 130) of the cleat 120 to be pressed slidably downward past and beneath the front edge 272A of clip 270 (at lower edge 282B of the respective prongs 280A, 280B), as shown in FIG. 9C. With this action, the lower surface 126B of the body 125 of cleat 120 becomes in full pressing contact against the upper surface 232A of the body 230 of the receiver frame 210, as further shown in FIG. 9C. Moreover, upon the recessed edge portions 133A, 133B sliding past and underneath the front edge 272A of the clip 270, the biasing rotational force RF1 causes the clip 270 to reverse its pivoting away from the front portion 130 of cleat 120, and to return its default action of the front edge 272A of clip 270 pressing rotationally downward against at least the front portion 130 of cleat 120, such as pressing rotationally downward against the ledge 137 and the outer walls 139A, 139B of the recess 134 of the front portion 130 of cleat 120. In particular, in this position, the outer edge portions 285A, 285B of the front edge 272A of the clip 270 become in pressing contact against the outer walls 139A, 139B of the front portion 130 of the cleat 120, such as schematically represented in at least FIGS. 6C and 9C. In some such examples, the recessed portion 283 of the front edge 272A of the clip 270 also may become in releasable pressing engagement against the convex-shaped wall 136 of the front portion 130 of the cleat 120, as shown in at least FIG. 6C. Moreover, as further shown in FIG. 6C, in some such examples, the first and second prongs 280A, 280B (of the front edge 272A) of the clip 270 may become positioned within the V-shaped recesses 138A, 138B of the front portion 130 of the cleat 120 defined at the opposite ends of the convex wall 136 of the front portion 130 of the cleat 120. This example arrangement, as described in association with at least FIG. 6C, hinders rotational movement of the front portion 130 of cleat 120 forcible upward (as represented via directional arrow UF in FIG. 9C), such as might occur during rowing movements when the front portion of the user's foot/shoe pulls upward during the cyclical downward and upward forces placed on the users' shoe. Moreover, this arrangement (as depicted in at least FIGS. 6C, 9C) also may hinder the front portion 130 of the cleat 120 from being dislodged laterally from the receiver 200 upon the expected forces normally expected during typical rowing motions, activities, etc.

Figure 10A:
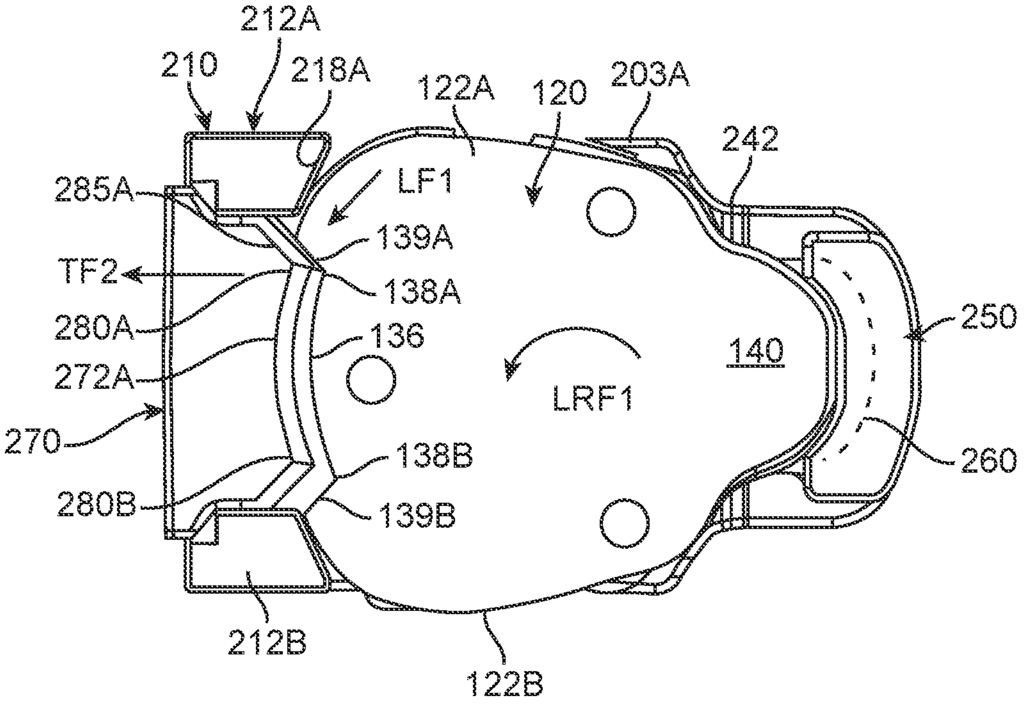
FIGS. 10A and 10B are a top plan view and side sectional view, respectively, schematically representing an example releasable fastening device including an example cleat being laterally rotated, relative to an example clip and an example frame, to initiate release of the cleat from the clip and receiver frame.
Figure 10B:
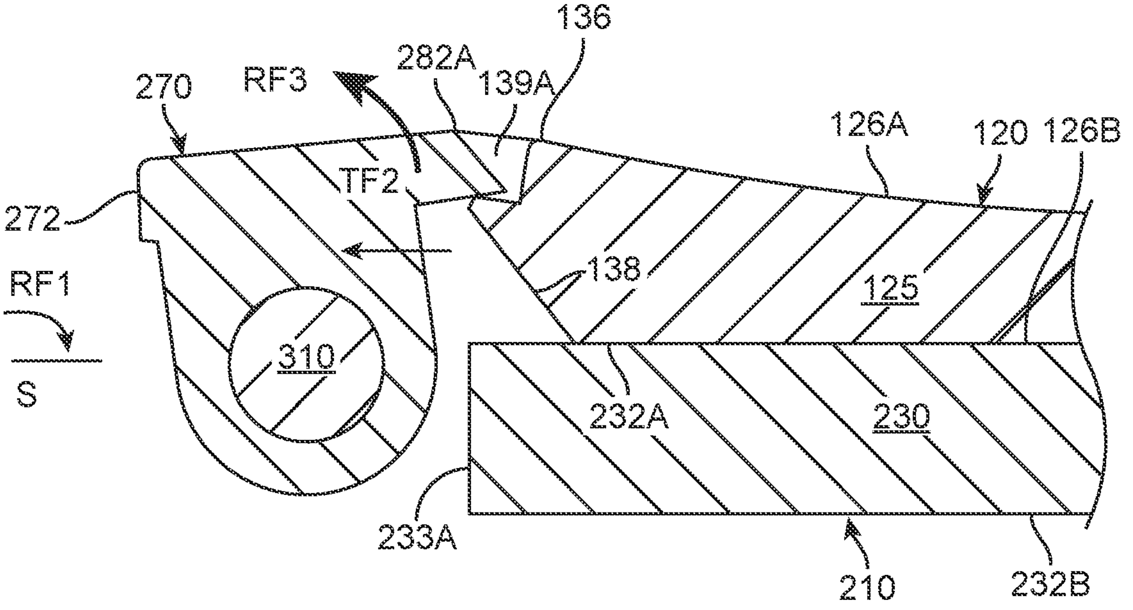

FIG. 10A is a top plan view depicting the cleat 120 being removably retained relative to receiver 200 in an arrangement similar to FIG. 6C, except further depicting a lateral rotational force (as represented via directional force arrow LRF1) being exerted via cleat 120 on the receiver 200 as the user attempts to intentionally remove their cleat 120 (and therefore shoe 105) from the receiver 200. This action would be initiated and driven by the user twisting the front portion 117 of their shoe 105 laterally relative to the receiver 200. As further shown in FIG. 10A, upon exertion of this lateral rotational force LRF1, the outer wall 139A of the recess 134 (of the front portion 130) of the cleat 120 presses laterally (as represented via directional force arrow LF1) against the outer wall 285A of the front portion 272A (near first prong 280A) of the cleat 120. This action exerts a translational force (as represented via directional force arrow TF2), as shown in FIG. 10B, which overcomes force components associated with the downward rotational force RF1 (e.g. FIGS. 9A-9C) on clip 270, thereby causing upward pivoting movement of the clip 270 in a manner similar to the action shown in FIG. 9B.

Figure 10C:
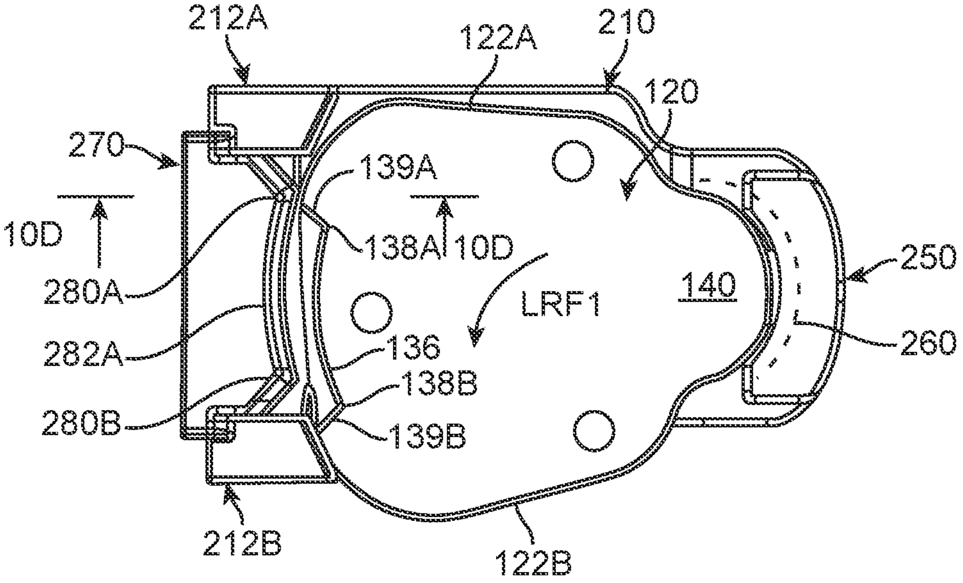
FIGS. 10C and 10D are a top plan view and side sectional view, respectively, schematically representing an example releasable fastening device including an example cleat being laterally rotated, relative to an example clip and an example frame, to further implement release of the cleat from the clip and receiver frame.
Figure 10D:
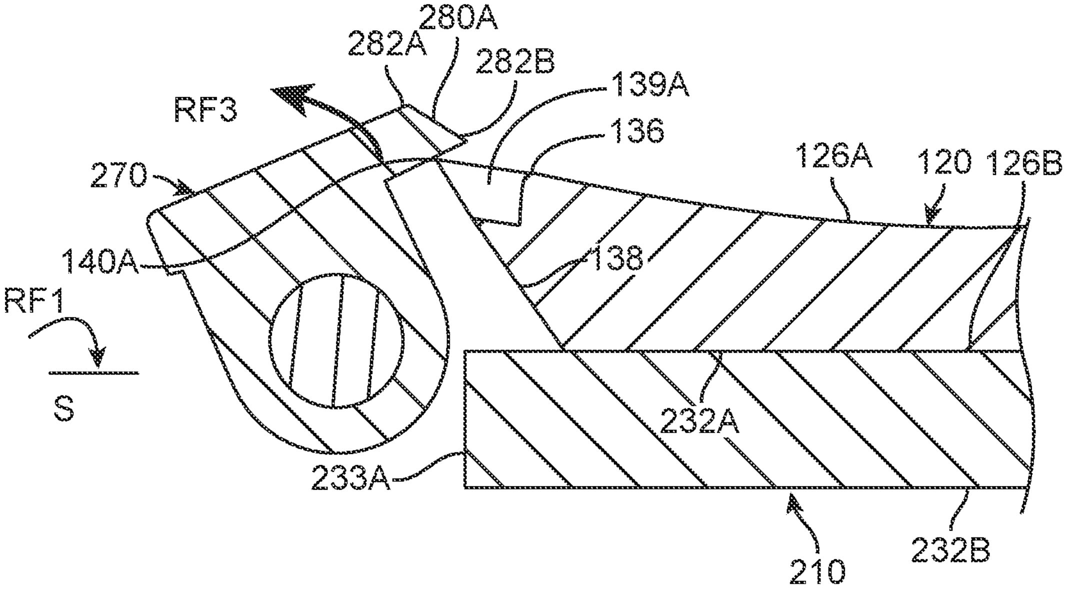

Continued lateral rotation of the front portion 130 of cleat 120 (as represented by arrow LRF1) results in the clip 270 pivoting (about pin 310) to the position shown in FIGS. 10C-10D, in which the front edge 272A of the clip 270 has been slidably moved above, and resting on the top of the junction 140A and/or rounded corner 142A of the front portion 130 of cleat 120 with the downward rotational force RF1 still exerting rotational downward pressure (by the front edge 272A of clip 270) to removably retain the front portion 130 of the cleat 120 within, and relative to, the receiver 200. In this position, as the cleat 120 is being rotated laterally, the front portion 130 of cleat 120 still meets some resistance caused by this rotational downward pressure from the front edge 272A of the clip 270, but this resistance is less than when the front edge 272A of the clip 270 is fully engaging the recess 134 of the front portion 130 of cleat 120, as in at least FIGS. 6C, 9C.

Figure 11A:
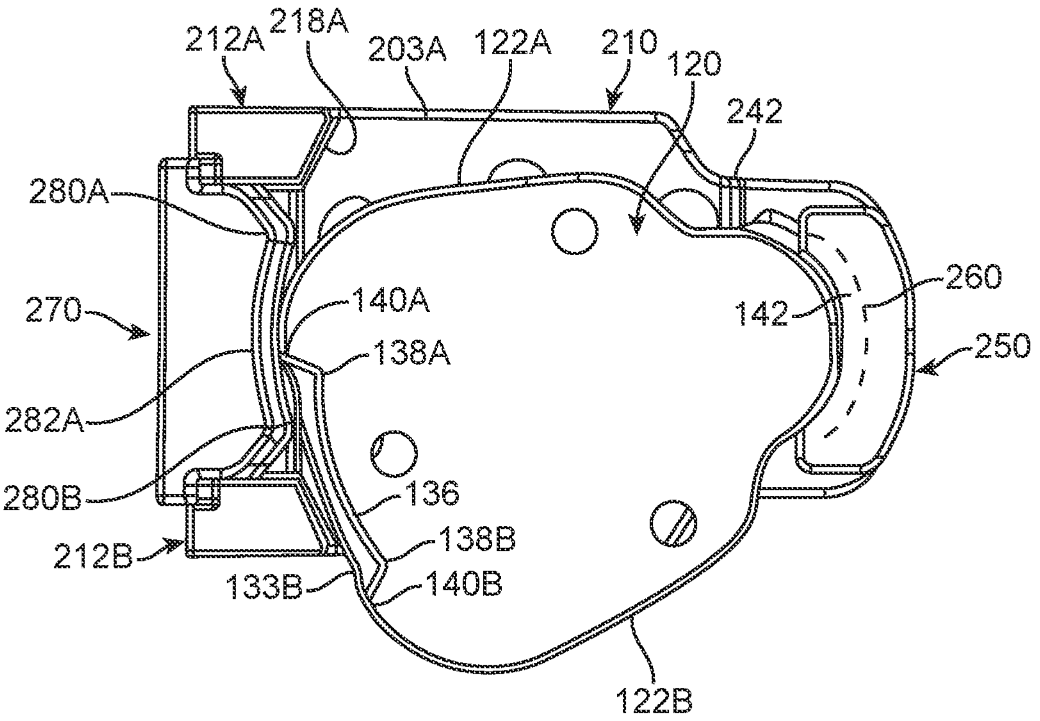
FIGS. 11A, 11B, 11C are a top plan view, a perspective view, and a top plan view respectively, schematically representing an example releasable fastening device including an example cleat being laterally rotated, relative to an example clip and an example frame, to further implement release of the cleat from the clip and receiver frame.
Figure 11B:
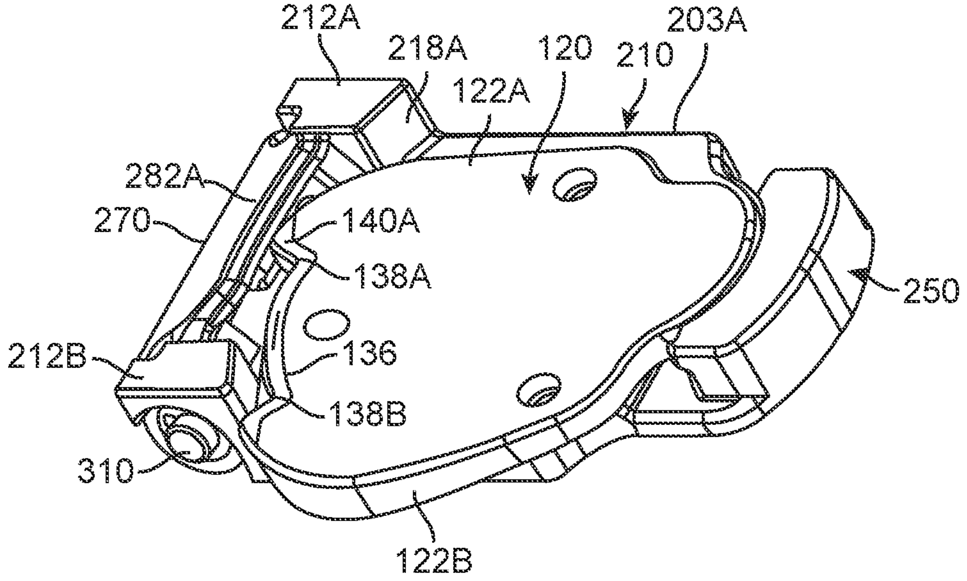

Further lateral rotation of the cleat 120, in the manner and direction shown in FIG. 10C, results in the arrangement shown in FIGS. 11A, 11B in which the cleat 120 is still generally removably retained within, and relative to, the receiver 200 despite the lateral rotation of the cleat 120.

Figure 11C:
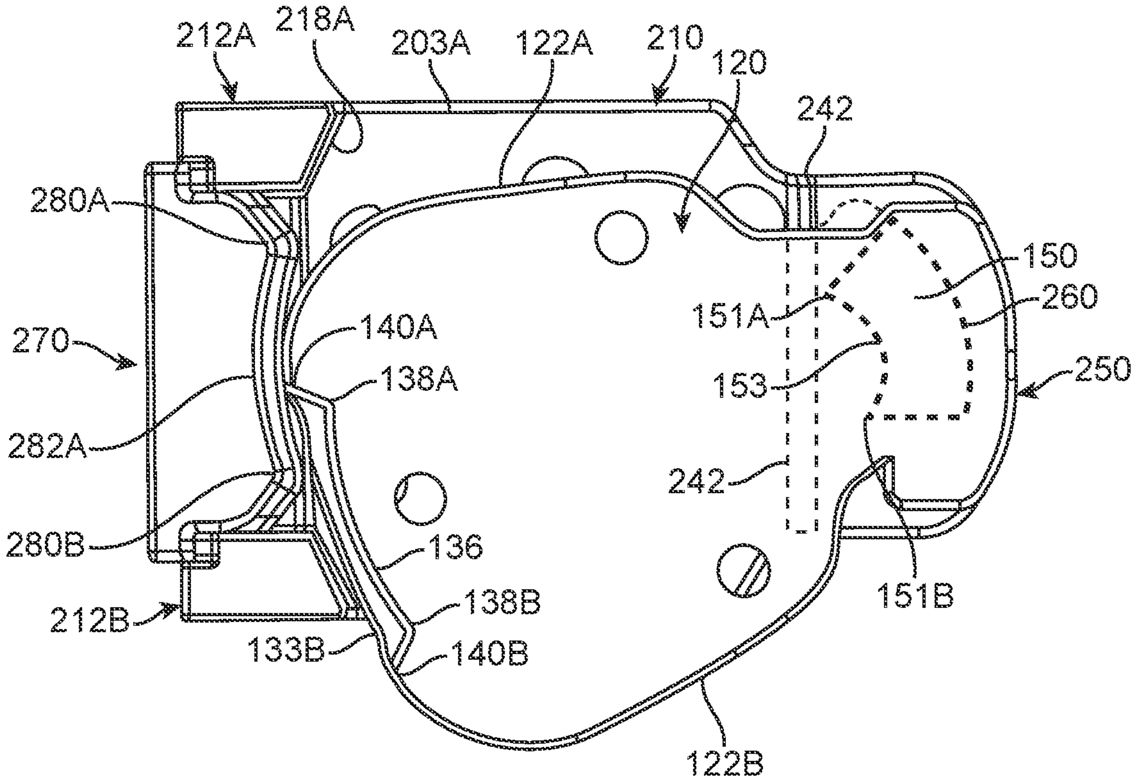
Figure 12A:
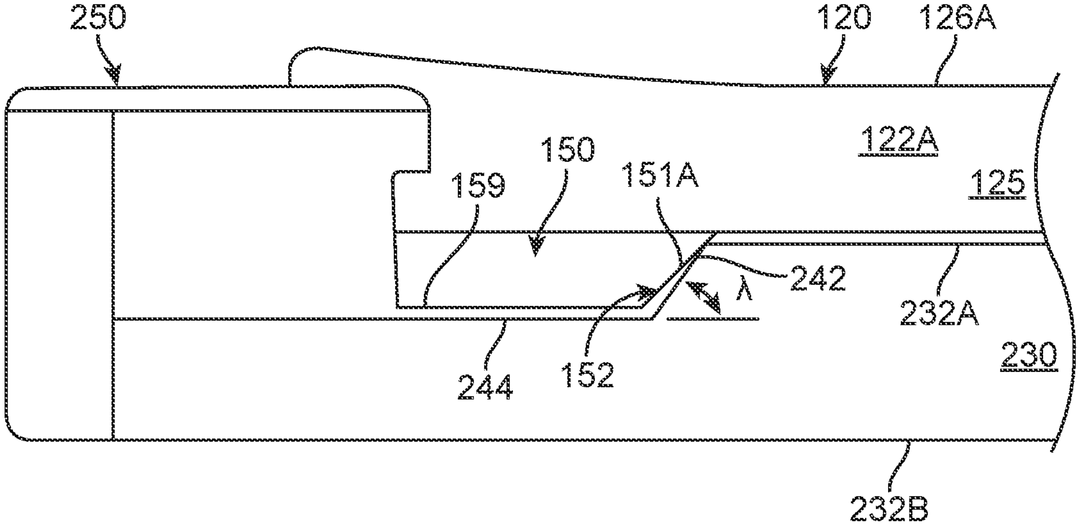
FIGS. 12A and 12B are side views schematically representing an initiation of a release, and/or partial release, of a rear portion of an example cleat from a rear portion of an example receiver frame.

However, upon further rotation of the front portion 130 of cleat 120, the rear extension portion 140 of the cleat 120 necessarily becomes rotated relative to the slot 260 within housing 250 (of the rear portion 240) of the receiver frame 210 and relative to the contact portion 244 (of the rear receiving portion 240) of the receiver frame 210 until the vertex portion 151A of first end/portion 152 of the footing 150 comes into contact against the transition 242 of the receiver frame 210, as shown in top plan view of FIG. 11C and the side view of FIG. 12A.

Figure 12B:
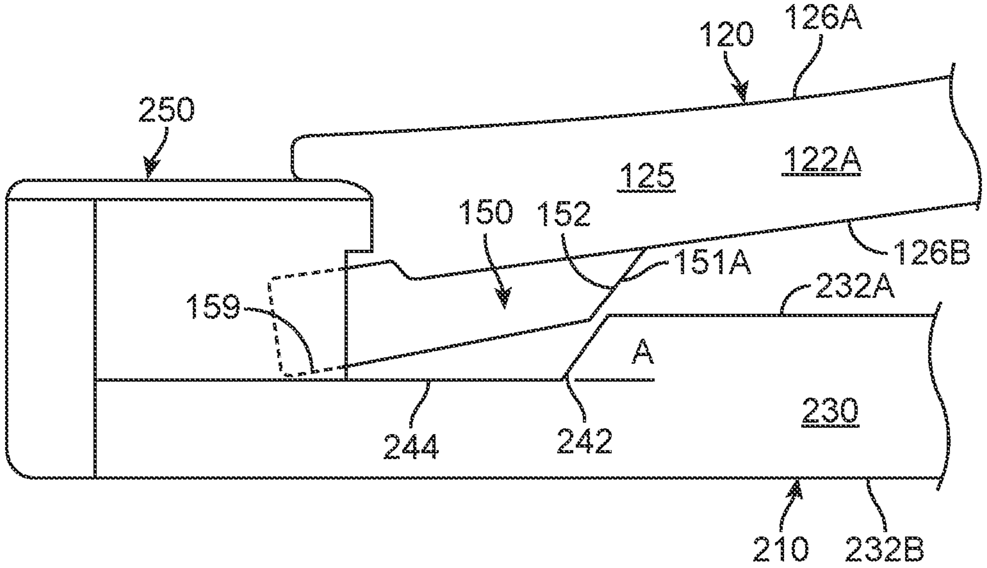
Figure 13:
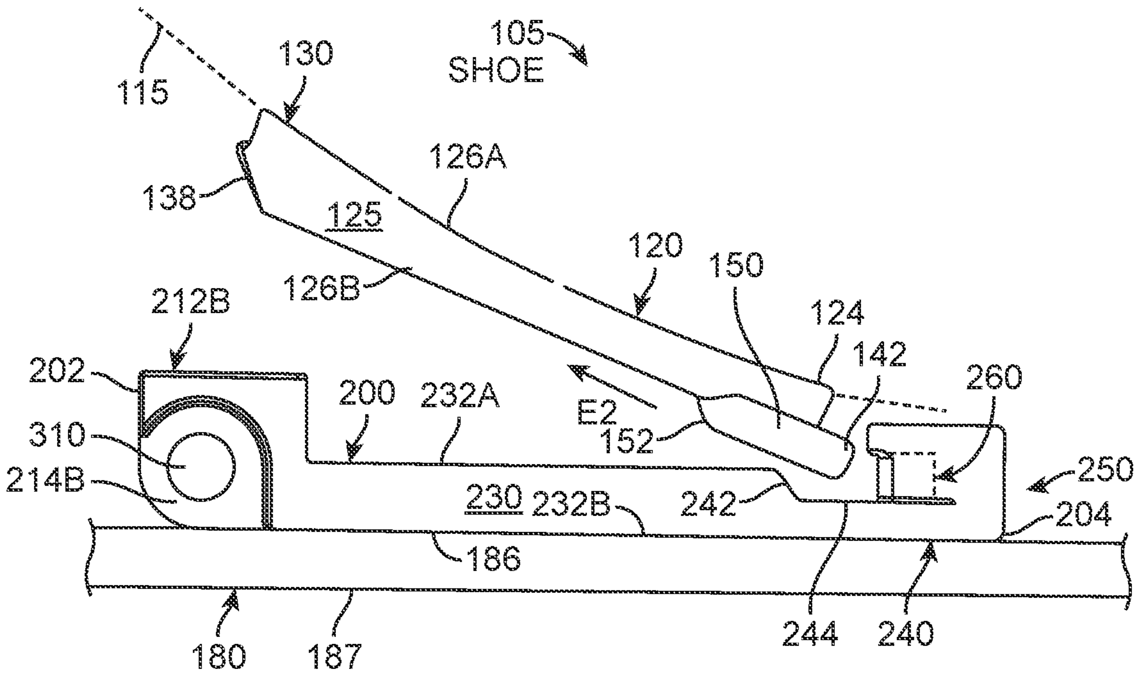
FIG. 13 is a side view schematically representing full release of a rear portion of an example cleat from a rear portion of an example receiver frame.

Further rotation of the cleat 120 causes the vertex portion 151A of the footing 150 (of the rear portion 140) of cleat 120 to slide up the beveled transition portion 242, which in turn causes the body 125 of the cleat 120 to pivotally move away from the base 230 of the receiver frame 210, as shown in FIG. 12B, such that the entire cleat 120 (and shoe 105) becomes free from removable retention by the receiver 200, as further shown in FIG. 13. For instance, as shown in FIG. 13, the cleat 120 moves away from receiver frame 210 as represented via directional arrow E2.

In addition to manner described above in which the footing 150 of the cleat 120 (in sliding contact with transition portion 242 of the receiver frame 210) facilitates the removal of cleat 120 from the receiver frame 210 as shown in at least FIGS. 11C, 12A-12B, and 13, it will be understood that in some examples, upon rotation of the cleat 120 to at least the position shown in FIGS. 11A, 11B, the user also may apply an upward lifting force on a front portion 130 of cleat 120 similar to the upward forces exerted as shown in FIG. 9C (e.g. see directional force arrow UF) to further facilitate removal of the cleat 120 (and therefore removal of shoe 105) from receiver frame 210.

FIGS. 14A-22 are diagrams schematically representing an example releasable fastening arrangement 1000 (e.g. FIG. 20-22) comprising a cleat 1120 (e.g. FIGS. 14A-14C) and a receiver 1200 (e.g. FIGS. 15A-18) by which a shoe 105 (FIGS. 1-2) may become releasably secured relative to a support 180. These examples may comprise (and/or may comprise features complementary to) at least some of substantially the same features and attributes of the example releasable fastening arrangement described in association with FIGS. 1-13.

Figure 14A:
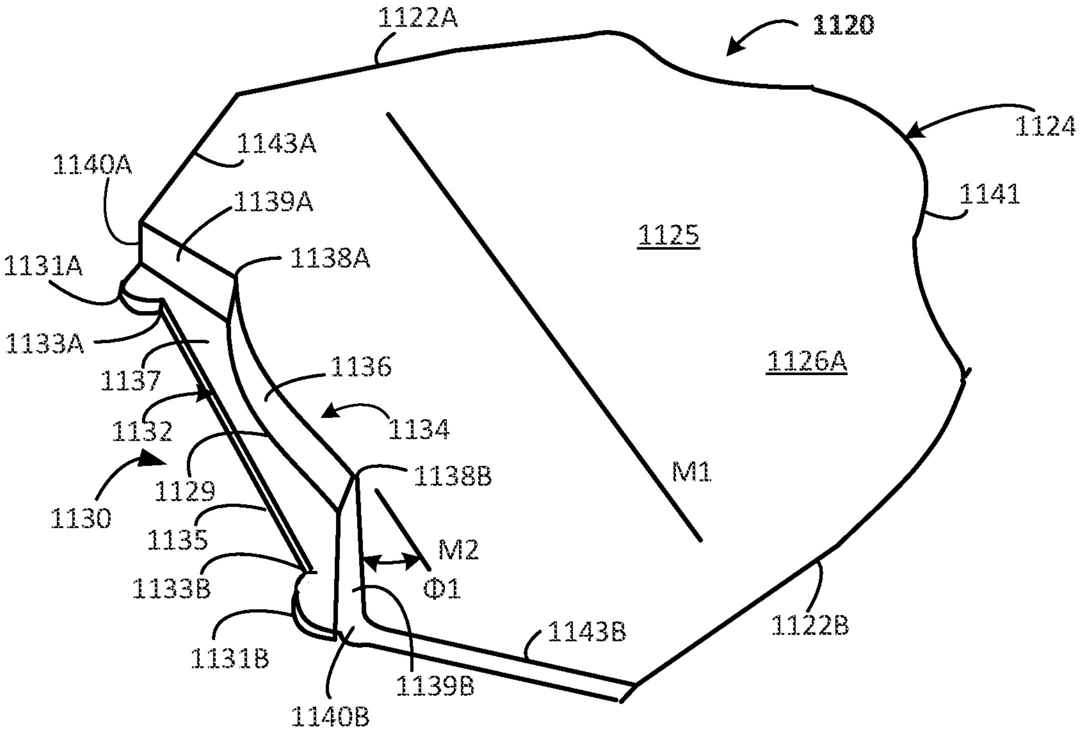
FIGS. 14A, 14B, and 14C are perspective view, side view, and bottom plan views, respectively, schematically representing an example cleat.
Figure 14B:
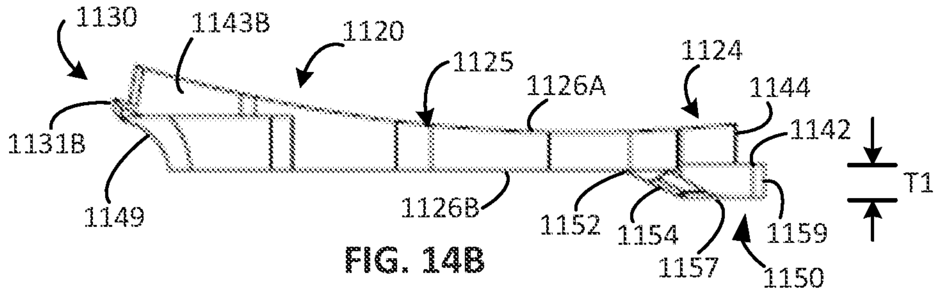
Figure 14C:
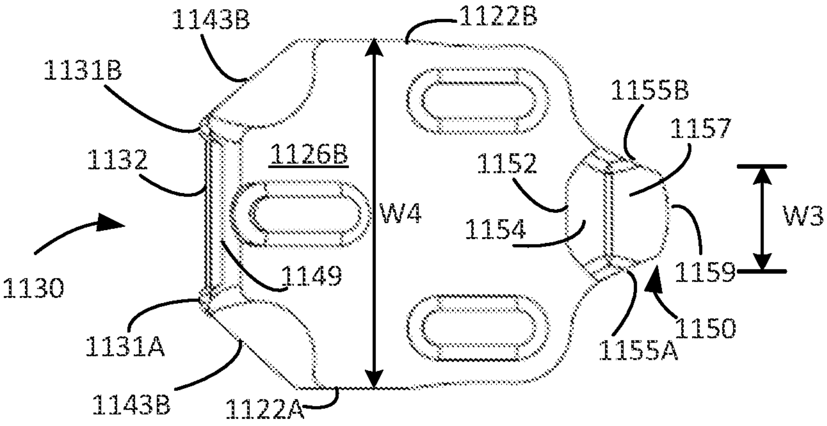

FIGS. 14A-14C are diagrams schematically representing the example cleat 1120, which may comprise at least some of substantially the same features and attributes of the example cleat 120 of FIGS. 1-13.

At least some features of the example cleat 1120 of FIGS. 14A-14C may provide generally the same function as at least some features as the cleat 120 of in FIG. 3A-3E, although such features may be implemented via differently shaped and/or sized elements.

As shown in at least FIG. 14A, cleat 1120 comprises body 1125 having a top surface 1126A, an opposite bottom surface 1126B (FIGS. 14B, 14C), and opposite sides 1122A, 1122B. In some examples, the top surface 1126A may be sized and shaped (e.g. concave) to complement a size and shape (e.g. convex) of the sole 115 of shoe 105, as shown in FIGS. 1-2.

Cleat 1120 also comprises first portion 1130 (e.g. front portion) and an opposite second portion 1124 (e.g. rear portion) at opposite ends of the body 1125. As further shown in at least FIG. 14A, the front portion 1130 comprises a recess 1134 defined, at least, by a front edge 1132, ledge 1137, and wall 1136. In some examples, wall 1136 may have a slight convex curvature. The ledge 1137 generally extends between the front edge 1132 and central wall 1136, and between front edge 1132 and the inner side wall portions 1139A, 1139B. The ledge 1137 may sometimes be referred to as a shelf. The ledge 1137 also comprises a back edge 1129 which forms a junction with the wall 1136. Meanwhile, the front edge 1132 may comprise a straight portion 1135 extending between spaced apart protrusions 1131A, 1131B. In some examples, each respective protrusion 1131A, 1131B forms a junction or crease 1133A, 1133B relative to the straight portion 1135.

Recess 1134 may be further defined by opposite inner side wall portions 1139A, 1139B, which are joined to central wall portion 1136 via junctions 1138A, 1138B, respectively. In some examples, each respective junction 1138A, 1138B may comprise a recess as shown in at least FIG. 14A (and later in FIGS. 19A-22). In some such examples, the recesses 1138A, 1138B may comprise a V-shape. In some examples, the distance between the creases 1133A, 1133B is greater than distance between the respective recesses 1138A, 1138B. In some examples, the inner side wall portions 1139A, 1139B extend at an angle Φ1 of about 30 degrees to about 40 degrees relative to a plane M2, which is parallel to a minor axis M1 of the cleat 1120 which extends laterally across a width of the cleat 1120. In some examples, the angle Φ1 may comprise about 35 degrees (e.g. 34.8, 34.9, 35, 35.1, 35.2 degrees).

In addition, opposite outer ends of the front edge 1132 align with an outer end 1140A, 1140B of each of the respective inner side wall portions 1139A 1139B. In some examples, these outer ends 1140A, 1140B may serve as contact or engagement surfaces (e.g. points of contact) for slidable engagement against various portions of catch element 1350, as further described later in association with at least FIGS. 15A-22. Accordingly, the outer ends 1140A, 1140B (of the respective inner side walls 1139A, 1139B) may sometimes be referred as prongs 1140A, 1140B (or as vertices or contact portions) in various examples of the present disclosure. As further shown in at least FIG. 14A, 14C, the cleat 1120 includes generally flat outer side wall portions 1143A, 1143B, which in some instances may be considered to part of the front portion 1130 of the cleat 1120. A junction of each respective outer side wall portion 1143A, 1143B with a respective inner side wall portion 1139A, 1139B further defines the respective prongs 1140A, 1140B.

As further shown in FIGS. 14B, 14C, the front portion 1130 of the cleat 1120 comprises a bottom arcuate portion 1149, which defines a surface extending rearwardly from the front edge 1132 to the bottom surface 1126B of the body 1125 of the cleat 1120. In some examples, the arcuate portion 1149 may be concave.

As further shown in at least FIGS. 14A-14C, in some examples the rear portion 1124 of the cleat 1120 may comprise a semi-circular shaped extension 1141 forming part of body 1125. This extension 1141 may sometimes be referred to as rear extension 1141. As seen in the side view of FIG. 14B, the rear extension 1141 of cleat 1120 also may comprise a footing 1150 which extends outwardly and rearwardly from a rear edge 1144 of body 1125, with a flange 1142 of the footing 1150 extending in a second plane (e.g. P2 in FIG. 3B) which is offset relative to a first plane P1 (e.g. FIG. 3B) through which the rear portion of the body 1125 (in rear extension 1140) extends.

With further reference to at least FIG. 14C, in some examples the footing 1150 has a width W3 which is substantially narrower (e.g. 30%, 40%, 50%, etc.) than a width W4 of the front portion 1130 of the cleat 1120. As shown in FIG. 14B, in some examples the footing 1150 has thickness T1 which generally corresponds to a height (e.g. H1 in FIG. 15B) of slot portion 1260 defined at the rear portion 1240 of the receiver frame 1210.

With further reference to FIGS. 14B-14C, in some examples a first end portion 1159 of the footing 1150 forms a portion of the flange 1142 as noted above, while an opposite second end 1152 of the footing 1150 extends forward, e.g. toward the first portion 1130 of the cleat 1120. As later shown and further described in association with at least FIGS. 15A-15B, 20-22, the various components of footing 1150 are sized, shaped, and positioned to selectively engage various structures (e.g. 1245, 1248, 1249, 1260) of the receiver frame 1210.

As further shown in at least FIGS. 14B and 14C, the footing 1150 may comprise a bottom portion 1157 which extends forward from end portion 1159 and which may extend in a plane generally parallel to a plane through which the bottom surface 1126B of body 1125 extends. In some examples, the bottom portion 1157 may sometimes be referred to as a contact portion. As later further described in association with at least FIGS. 15A, 20-22, the contact portion 1157 may be sized and/or shaped to be removably received for sliding and/or rotational contact within (and against) a recessed contact portion 1248 of the platform 1241 of receiver frame 1210.

In some examples, the footing 1150 also may comprise a front beveled portion 1154, which extends forward (e.g. toward front portion 113) from the bottom portion 1157 and intersects with surface 1126B of body 1125 of cleat 1120. Footing 1150 also may comprise opposite outer sides 1155A, 1155B. In some examples, the front beveled portion 1154 forms an angle relative to the bottom surface 1126B of the cleat 120, which may have similar values like the example angles described in association with FIG. 3F. In some such examples, the front beveled portion 1154 may facilitate slidably entry and exit of the footing 1150 of cleat 1120 during general entry and exit of the cleat as a whole relative to the receiver 1200.

Figure 15A:
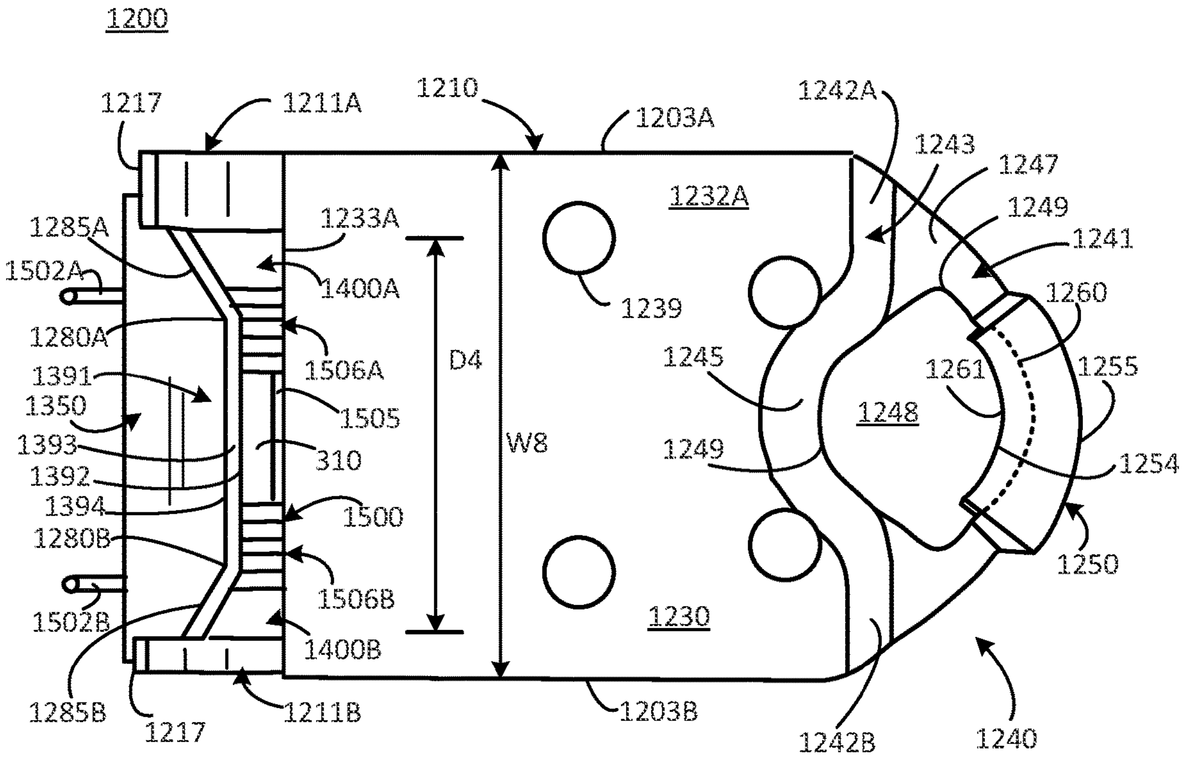
FIG. 15A is a top plan view schematically representing an example receiver including a catch element pivotally mounted relative to a front portion of a receiver frame.
Figure 15B:
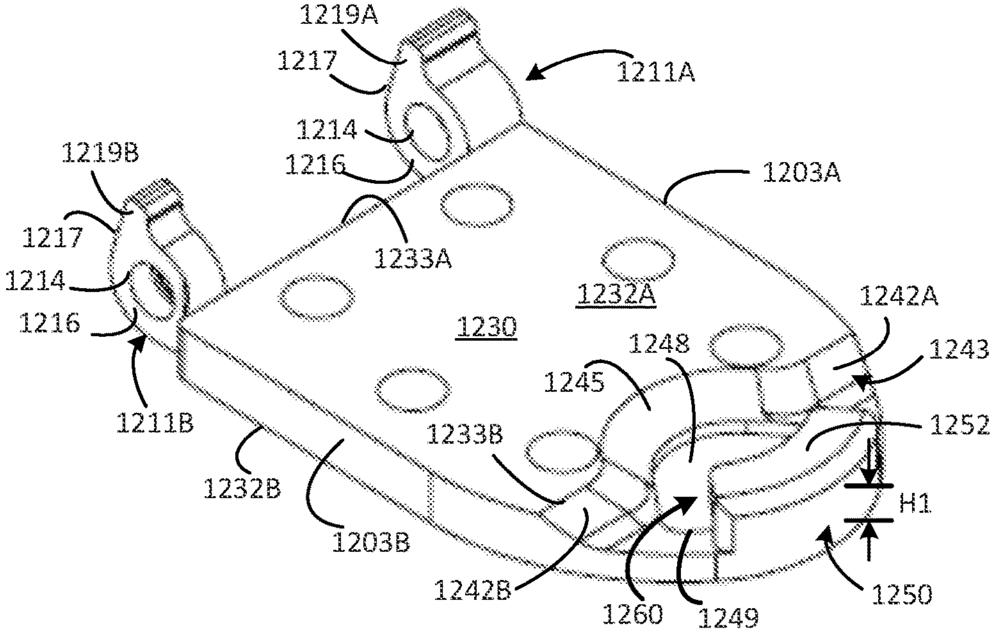
FIG. 15B is a perspective view schematically representing an example receiver frame.

FIGS. 15A-15B are diagrams which schematically represent an example receiver 1200, including example receiver frame 1210 and example catch element 1350. In some examples, the receiver 1200 comprises at least some of substantially the same features and attributes as receiver 200 in FIGS. 1-2 and/or may be an example implementation of the receiver 200 in FIGS. 1-2 (and FIGS. 3A-13).

In general terms, the receiver 1200 is to removably receive cleat 1120 with at least catch element 1350 releasably retaining the cleat 1120 within and relative to the receiver frame 1210. However, prior to describing this interaction, details regarding the receiver frame 1210 and the catch element 1350 will be provided.

As shown in at least FIGS. 15A-15B, in some examples receiver frame 1210 may comprise a base 1230 having a first surface 1232A (e.g. upper surface) and opposite second surface 1232B (e.g. lower surface). The first surface 1232A may act as a primary surface to support the second surface portion 1126B of the base 1125 of cleat 1120, as shown in FIGS. 14A-14C, when the cleat 1120 is releasably secured within and relative to the receiver 1200. Meanwhile, the opposite second surface 1232B of the base 230 (FIG. 15B) may act as a primary surface to be secured against a support, such as support 180 as shown in at least FIGS. 1-2. Moreover, the base 1230 may comprise a plurality of holes 1239 to facilitate use of fasteners to secure the receiver frame 1210 relative to the support 180 (FIGS. 1-2).

As further shown in FIG. 15A-15B, the base 1230 may comprise a first end 1233A from which a pair of extension members 1211A, 1211B extend forwardly from the base 1230, with extension members 1211A, 1211B spaced apart by a distance D4, with each extension member 1211A, 1211B located adjacent a respective side edge 1203A, 1203B of the base 1230. The distance D4 may correspond to a width of at least a portion of the catch element 1350, as shown in FIG. 15A such that the extension members 1211A, 1211B are spaced apart by a distance suited to slidably receive the catch element 1350 therebetween. As further shown in at least FIG. 15B, each extension member 1211A, 1211B comprises a panel 1216, which defines a hole 1214. The panel 1216 may sometimes be referred to as a collar portion. Each hole 1214 is sized to slidably receive a pin, such as pin 310 shown in at least FIGS. 15A, 17, or as previously described in association with at least FIGS. 6A-6B.

In some examples, extension members 1211A, 1211B extend forward of the base 1230 of the receiver frame 1210 and also may comprise an upper portion 1219A, 1219B (e.g. protrusion). As shown in FIGS. 15A-15B, and as further described later in association with at least FIGS. 16A-18 and FIGS. 19A-22, each extension member 1211A, 1211B comprises a contact portion 1217 (e.g. structure) against which a portion (e.g. support wings 1411) of the catch element 1350 may be releasably engaged to at least partially control a range of rotational movement of the catch element 1350 relative to the front edge 1233A of the receiver base 1230.

With further reference to FIGS. 15A-15B, the base 1230 of the receiver frame 1210 may comprise a width W8, which may generally correspond to a greatest lateral dimension (W4) (e.g. width) of the base 1125 of the cleat 1120 in some examples as shown in FIG. 14C.

As further shown in FIGS. 15A-15B, in some examples, the body 1230 of the receiver frame 1210 comprises a rear edge portion 1243 from which extends a rear receiving portion 1240. In some examples, at least a portion of the rear edge portion 1243 of the rear receiving portion 1240 may comprise a beveled surface which forms an angle which may be complementary relative to the angle of the front beveled portion 1154 the footing 1150 of the cleat 1120, as shown in at least FIG. 14C. A central portion 1245 of the beveled rear edge portion 1243 may comprise an arcuate shape and with the central portion 1245 being interposed between, and recessed relative to outer side portions 1242A, 1242B of the rear edge portion 1243. The central portion 1245 may facilitate slidable movement of the footing 1150 of cleat 1120 during entry and exit of the footing 1150 of cleat 1120 relative to the rear receiving portion 1240 of the receiver frame 1210.

As further shown in FIGS. 15A-15B, in some examples the rear receiving portion 1240 may comprise a platform 1241 which extends rearwardly from the rear edge portion 1243 and which defines, among other things, a recessed contact portion 1248 against which the footing 1150 of the cleat 1120 may be supported. The recessed contact portion 1248 is at least partially defined via edge 1249 formed in platform 1241 and is interposed between the rear edge portion 1243 (of base 1230) and the housing 1250. Via this arrangement, at least the bottom portion 1157 of the footing 1150 of cleat 1120 may contact, and be slidably movable (e.g. rotation, translation), relative to the recessed contact portion 1248 with the edge 1249 at least partially constraining a range of movement of the footing 1150 of the cleat 1120. At least some aspects of this overall arrangement are further illustrated later in association with at least FIGS. 20-22.

Along with housing 1250, the platform 1241 defines (at least) a slot 1260 sized, shaped, and oriented to slidably receive the footing 1150 of the cleat 1120, in a manner similar to the examples previously shown in association with in at least FIGS. 7A, 7B, 12A. As shown in at least FIGS. 15A-15B, the slot 1260 is accessible via an opening 1261 defined in an inner end 1254 of the housing 1250, while an outer end 1255 of the housing 1250 is closed and generally defines an end of the receiver frame 1210. FIG. 4B also provides an analogous example arrangement.

Figure 20:
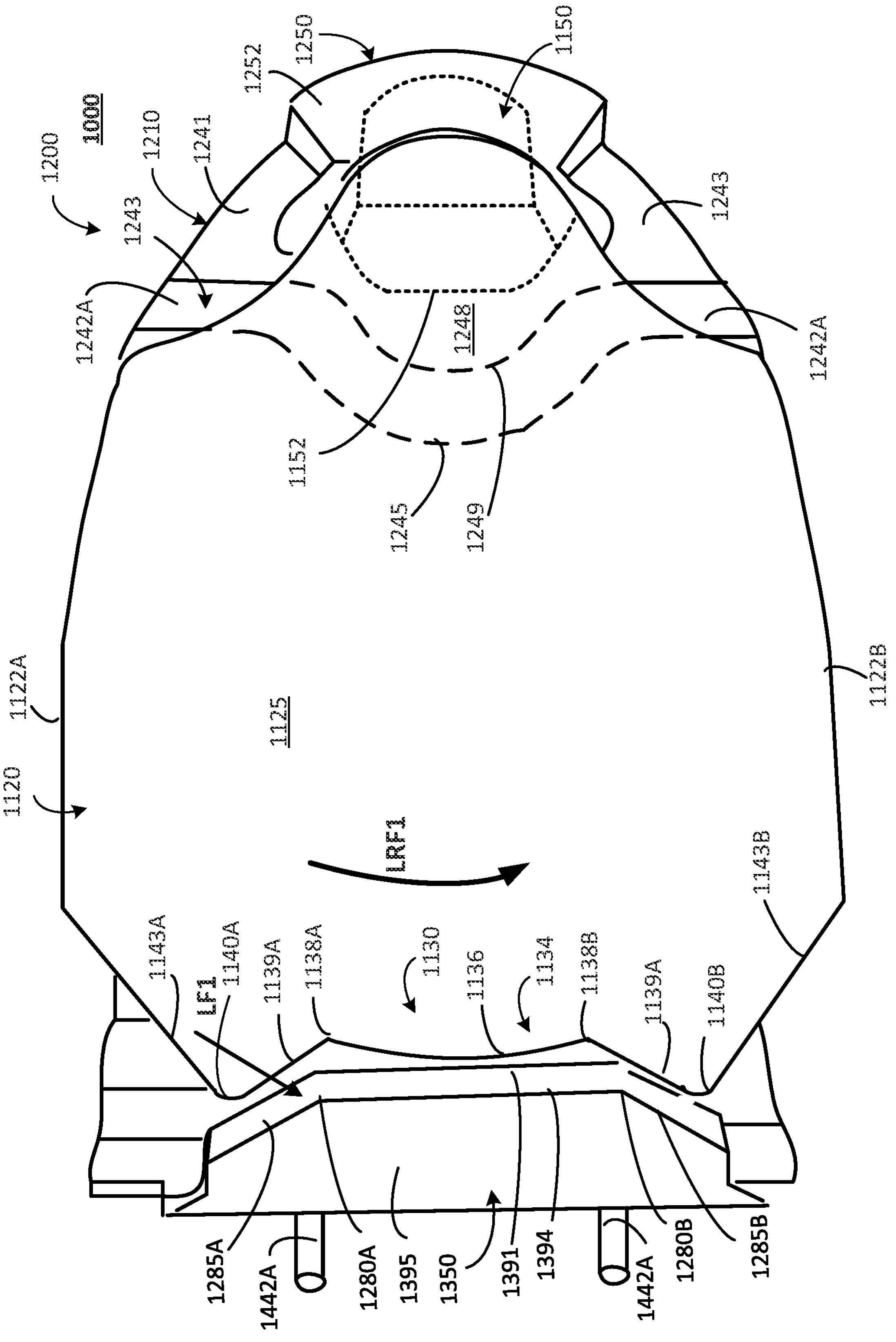
FIGS. 20, 21, 22 are a top plan view, a perspective view, and a top plan view respectively, schematically representing an example releasable fastening device including an example cleat being laterally rotated, relative to an example clip and an example frame, to further implement release of the cleat from the clip and receiver frame.
Figure 21:
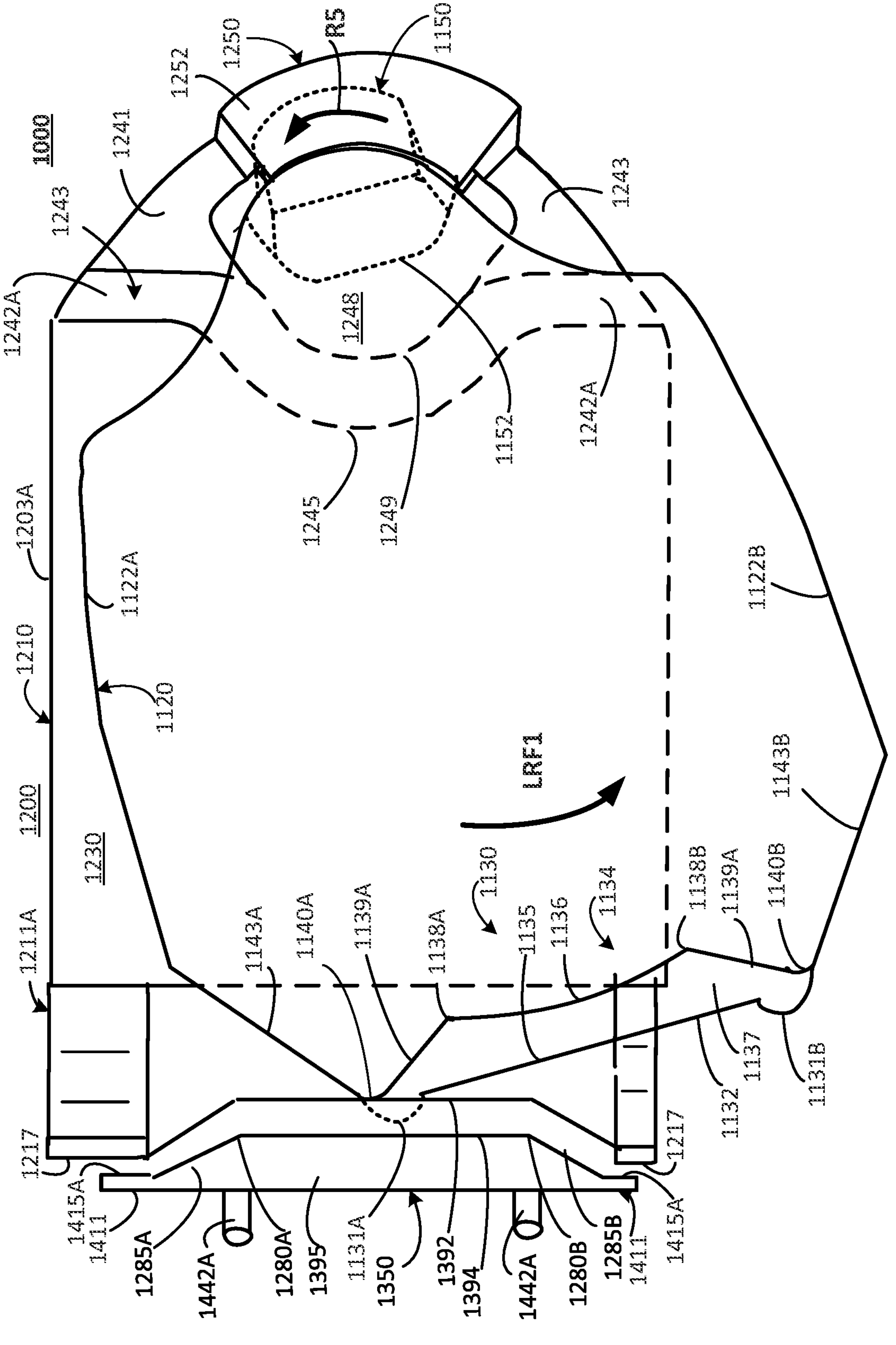
Figure 22:
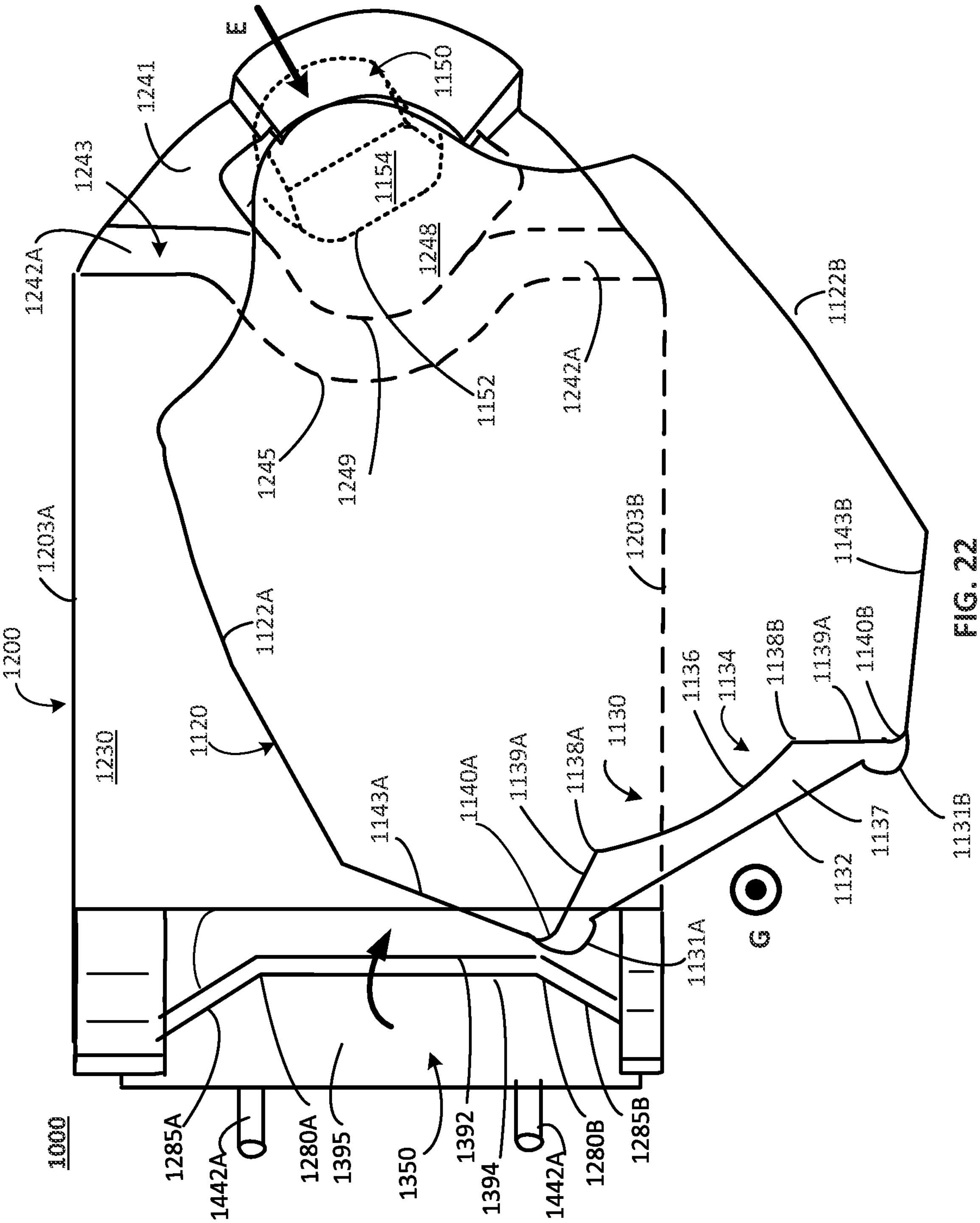

In some examples, a roof of the housing 1250 also may enable slidable movement and retention of flange 1142 of footing 1150 relative to housing 1250, such as during rotation of the footing 1150 as further described in association with at least FIGS. 20-22. In some examples, the thickness (T1 in FIG. 14B) of the footing 1150 and the size of the slot portion 1260 are selected to be complementary, which may contribute to removably retaining the footing 1150 within the housing 1250 during the rotational movements as later described in association with at least FIGS. 20-22.

As previously mentioned and as further shown in FIG. 15A, adjacent front edge 1233A, the receiver 1200 comprises example catch element 1350 pivotally mounted relative to, and between, the extension members 1211A, 1211B of receiver frame 1210 in a manner generally similar to the examples shown in FIGS. 6A-6B, such as using pin 310. However, differences between the arrangement of catch element 1350 and receiver frame 1210 (FIG. 15A-15B) and the arrangement of clip 270 and receiver frame 210 in FIGS. 1-13 will be appreciated with at least some of those differences further described below.

In some examples, the catch element 1350 shown in FIG. 15A (and FIGS. 16A-18) may comprise at least some of substantially the same features and attributes as clip 270 in FIGS. 1-2 and/or may be an example implementation of the clip 270 in FIGS. 1-2. At least some aspects of the example catch element 1350 are described further in association with FIGS. 16A-18, FIGS. 19A-19D, and FIGS. 20-22.

With this in mind, and with further reference to at least FIGS. 16A-18, the example catch element 1350 comprises a pair of laterally spaced apart, arms 1400A, 1400B and a central body 1351 (e.g. elongate element) extending between the respective arms 1400A, 1400B. In particular, each arm 1400A, 1400B comprises a respective collar portion 1402A, 1402B and an upper portion 1410A, 1410B (respectively), as seen in at least FIG. 16B. Each respective collar portions 1402A, 1402B may sometimes be referred to as a lower portion of the respective arms 1400A, 1400B.

In some examples, the upper portions 1410A, 1410B of arms 1400A, 1400B support and partially forms opposite ends of the central body 1351 of catch element 1350, as further described below. In particular, in some examples, the catch element 1350 comprises a single unitary piece (e.g. monolithic piece), formed via molding, additive manufacturing, and the like. Accordingly, in some such examples the upper portion 1410A, 1410B (of each respective arm 1400A, 1400B) may be inseparable from the central body 1351, with the central body 1351 forming a bridge between the spaced apart upper arm portions 1410A, 1410B. With this in mind, a dashed line L in FIG. 16B may represent a border between each opposite end of central body 1351 and a respective one of the upper arm portions 1410A, 1410B. It will be understood that in some examples, the outer ends of the central body 1351 and the upper arm portions 1410A, 1410B blend together with no structural discontinuity occurring at the borders (L).

Moreover, in some examples at least a portion of the central body 1351 may extend within a plane common with (or generally parallel to) the upper arm portions 1410A, 1410B such that, for purposes of controlling rotational movement of the catch element 1350 relative to the receiver frame 1210, the central body 1351 and the upper arm portions 1410A, 1410B may be understood as forming a single rotatable structure, i.e. effectively a single arm which supports and positions hook portion 1391 for releasable engagement with a front portion 1130 of cleat 1120, as further described below. At least some aspects of this rotational behavior and the effectively single rotatable arm of catch element 1350 are further described below later in association with FIGS. 17-18. In some such examples, the single rotatable structure (i.e. effectively a single arm) may be rotatably movable within a range of rotational movement between a first and second angular orientation A2, B2 as shown and described later in association with at least FIG. 18.

Figure 16A:
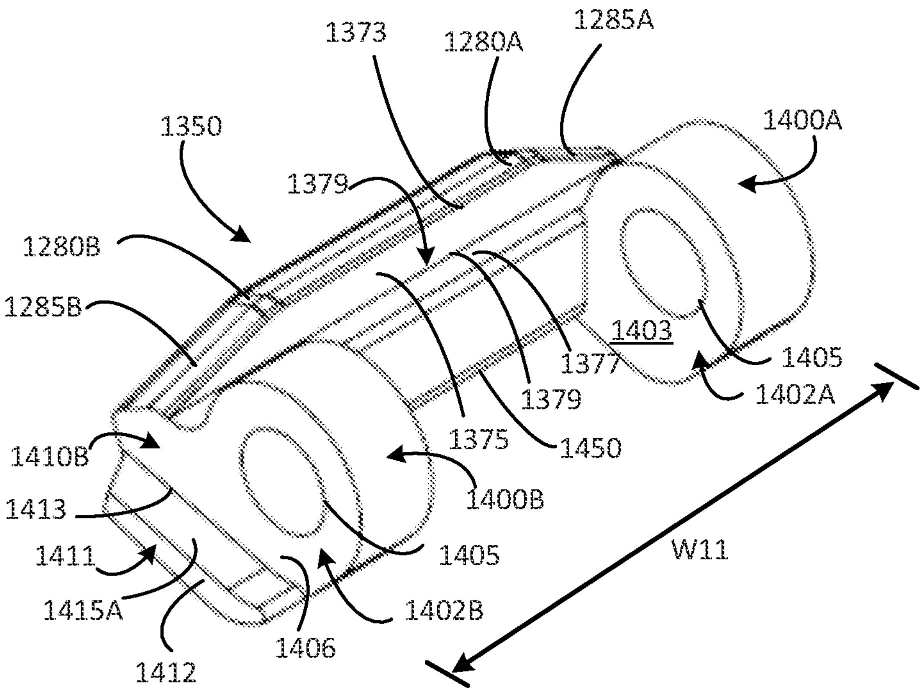
FIGS. 16A and 16B are perspective and side views, respectively, schematically representing an example catch element.
Figure 17:
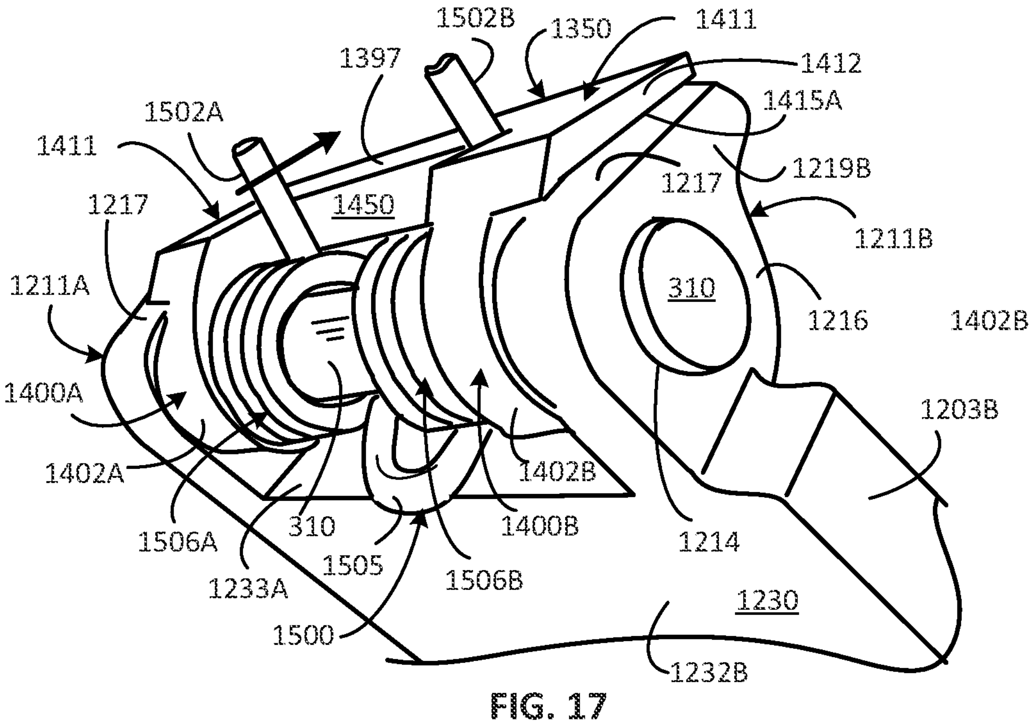
FIG. 17 is a perspective view schematically representing an example catch element pivotally mounted relative to a front portion of an example receiver frame.
Figure 18:
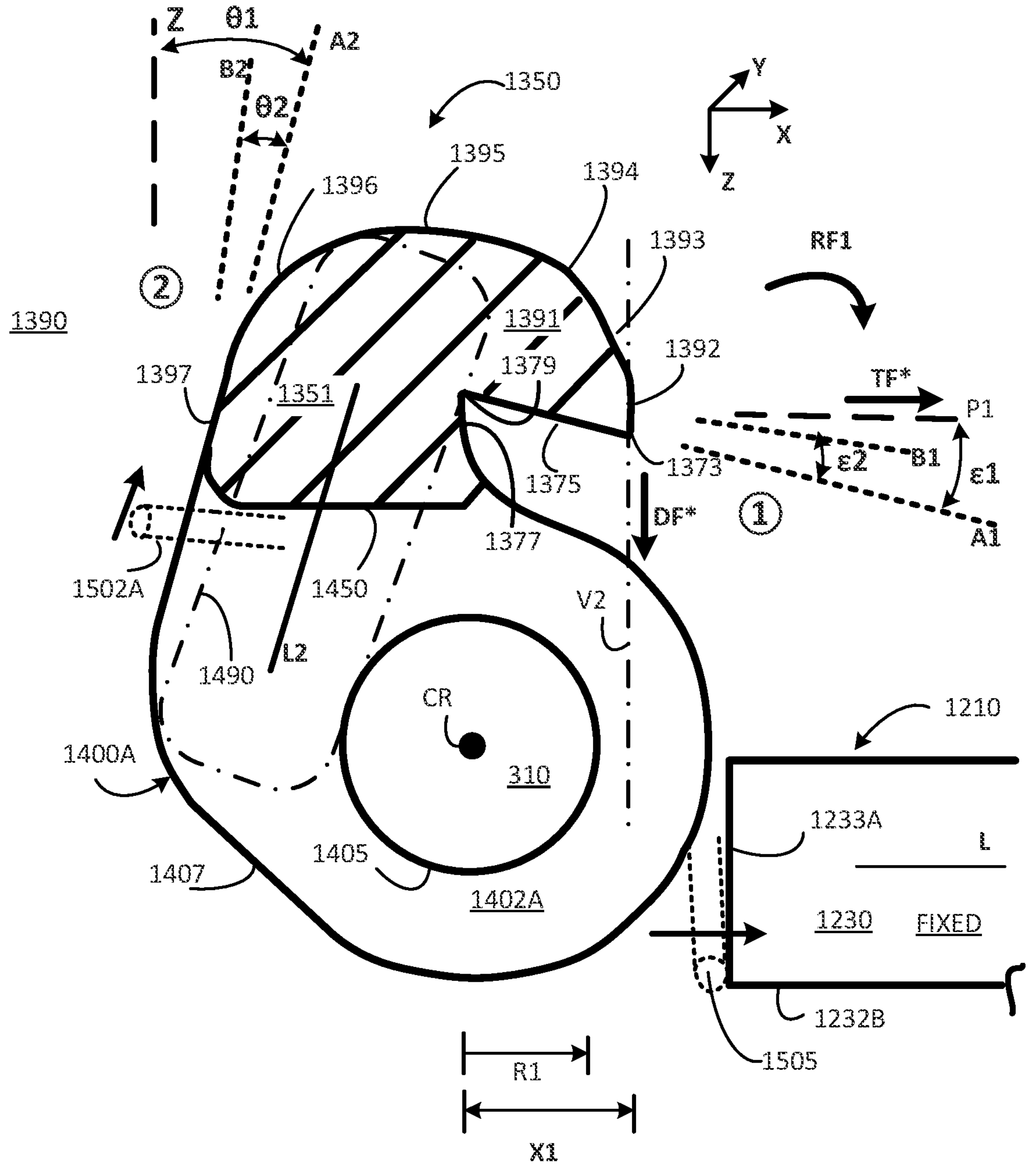
FIG. 18 is a diagram including a side sectional view schematically representing an example catch element.

As further shown in FIGS. 16A and 17-18, each respective collar portion 1402A, 1402B (of arms 1400A, 1400B of catch element 1350) comprises an annular-shaped (e.g. ring-shaped) flange defining a hole 1405 sized, shaped, and aligned to slidably receive a pin 310 shown in FIGS. 15A, 17, and 18. As previously noted, the pin 310 may comprise at least some of substantially the same features and attributes as pin 310 in FIGS. 6A-6B.

Figure 16B:
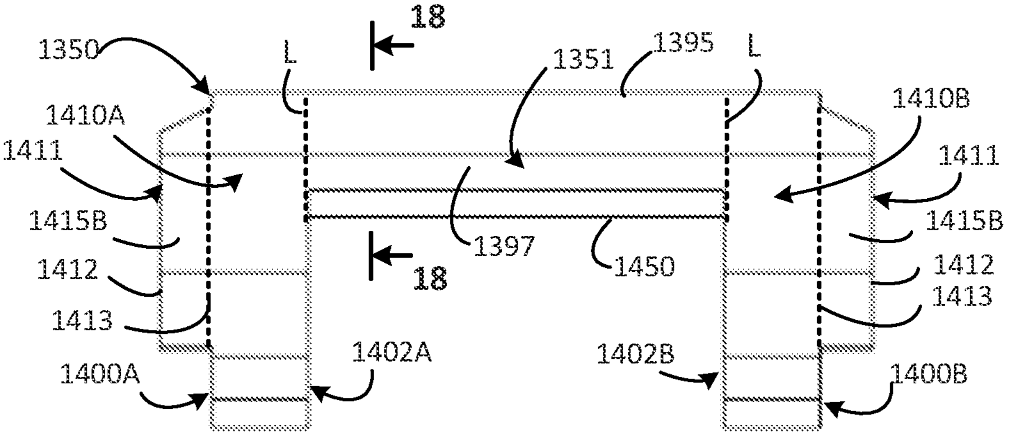

With further reference to FIGS. 16A-16B, in some examples, a distance (W11) between an outer surface 1406 of the respective collar portions 1402A, 1402B is substantially the same as the distance D4 (FIG. 15A) between an inner surface of the respective extension members 1211A, 1211B of the receiver frame 1210, such that the collar portions 1402A, 1402B of the catch element 1350 are slidably receivable between the extension members 1211A, 1211B of the receiver frame 1210, as further shown in at least FIG. 17. With this in mind, the hole 1405 of each collar portion 1402A, 1402B of the catch element 1350 is alignable with a hole 1214 of the panel 1216 (i.e. collar portion) of the extension members 1211A, 1211B of receiver frame 1210 for slidably receiving pin 310 for pivotal mounting of the arms 1400A, 1400B of catch element 1350 relative to the extension members 1211A, 1211B.

Via this arrangement, the collar portions 1402A, 1402B of the catch element 1350 become removably secured between, and are slidably rotatable (about pin 310) relative to, the fixed extension members 1211A, 1211B of the receiver frame 1210, as shown in at least FIGS. 15A and 17. This arrangement enables rotational movement of the entire catch element 1350 relative to the receiver frame 1210. This rotational movement may occur at least within a predetermined range of motion controllable via additional components such as, but not limited to, spring 1500 as further described later in association with at least FIGS. 15A, 17-22.

As further shown in FIGS. 16A-16B, in some examples the catch element 1350 may comprise a pair of support wings 1411, each of which extends laterally outward from a respective one of the arms 1400A, 1400B from the junction 1413. It will be understood that the support wings 1411 do not form a separate physical structure but instead form part of a unitary single structure including the arms 1400A, 1400B and support wings 1411, in some examples. Each support wing 1411 may comprise an outer edge 1412, an inner surface portion 1415A and an opposite outer surface portion 1415B, with the inner surface portion 1415A acting as a contact surface portion for releasably contacting (e.g. engaging) a contact surface 1217 of the extension members 1211A, 1211B of receiver frame 1210, as further described later in association with at least FIGS. 17, 19C-19D, and 21.

As further shown in FIGS. 16A-17, the central body 1351 of catch element 1350 comprises a contact portion 1450 to receive contact from arms 1502A, 1502B (FIG. 17) of a spring 1500 for exerting a rotational biasing force on the catch element.

With these features of catch element 1350 in mind, further reference is made to at least FIG. 15A (with FIG. 17) which illustrates one example implementation in which a spring 1500 may be mounted on or relative to the pin 310, relative to contact portion 1450 of catch element 1350, and/or relative to the front edge 1233A of receiver frame 1210 in order to provide a rotational biasing force acting on the catch element 1350. In some examples, this operational arrangement may be used to control a range of motion, direction of pivotal rotation, etc. of the catch element 1350 relative to the first end 1233A of the receiver frame 1210. In some examples, the rotational biasing force supplied by spring 1500 (and/or other element) may be consistent with, and/or comprise at least some of substantially the same features and attributes as previously described in at least FIGS. 9A-9C, 10B, which depict the action of such biasing force and/or other rotational forces acting counter to the rotational biasing force (e.g. RF1 in FIG. 18) acting on catch element 1350. In some examples, the spring 1500 in the examples of FIGS. 14A-22 and/or the spring in the examples of FIGS. 1-13 may comprise a torsion spring. In some examples, the spring 1500 may comprise one example implementation of, and/or may sometimes be referred to as, a rotational biasing element.

Figure 19A:
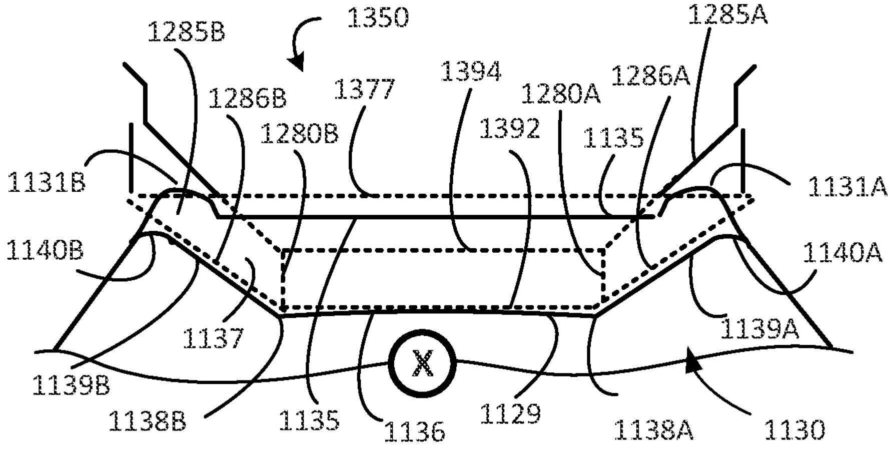
FIGS. 19A-19B, 19D are diagrams including a top plan view schematically representing an example method of releasably retaining a front portion of a cleat relative with, and relative to, a catch element.

In some examples, the biasing force and structure of the spring 1500 (relative to the catch element 1350 and receiver frame 1210) are arranged to cause the catch element 1350 to have at least: (1) a default, resting position as shown in FIG. 15A, 19A (previously shown in an analogous manner at least FIG. 6A. 6B, 8A, 9A) prior to the cleat 1120 being removably secured within (e.g. relative to) the receiver 1200; (2) a dynamic position shown in at least FIGS. 19B, 21, 22 (previously shown in an analogous manner in FIGS. 9B, 11A, 11B) in which the cleat 1120 is either being inserted into, or being removed from the receiver 1200; (3) an in-use, securing position as shown in at least FIG. 19D, 20 (previously shown in an analogous manner in FIGS. 1B, 9C, 10B) in which the cleat 1120 is secured within the receiver 1200; or (4) positions between the above-identified positions as when the catch element 1350 is moved between the resting position, dynamic positions, and securing position.

As shown in FIGS. 15A and 17, spring 1500 may comprise a pair of coiled portions 1506A, 1506B (each including a series of coils) which are laterally spaced apart with a first arm 1505 interposed between the respective coiled portions 1506A, 1506B. Spring 1500 also may comprise a pair of second arms 1502A, 1502B extending outward (in generally the same direction) from an outer end of the respective coiled portions 1506A, 1506B.

As further shown in FIGS. 15A, 17, in some examples, the spring 1500 is positioned, on pin 310, between the collar portions 1402A, 1402B of the arms 1400A, 1400B of the catch element 1350 and with the arms 1502A, 1502B of spring 1500 in pressing engagement against the bottom portion 1450 of the central body 1351 of the catch element 1350. The central, single arm 1505 of spring 1500 is in pressing engagement against the front edge 1233A of the receiver frame 1210. Via this positioning, the single arm 1505 pressing against front edge 1233A of receiver frame 1210 acts as an anchor to support the coiled portions 1506A, 1506B of spring 1500 exerting a rotational biasing force, via arms 1502A, 1502B, against the central body 1351 (at bottom portion 1450) of catch element 1350 to forcibly bias the central body 1351 of the catch element 1350 generally toward the receiver frame 1210, and specifically toward and onto the front portion 1130 of cleat 1120 when present, as further described below. This operational effect of spring 1500 is also schematically represented in the side sectional view of FIG. 18.

As further shown in at least FIG. 15A, in some examples catch element 1350 may comprise a hook portion 1391, which includes a front edge portion 1392, first beveled surface portion 1393, and a border portion 1394. The first beveled surface portion 1393 extends vertically upward and at an angle between the front edge portion 1392 and the front border 1394. FIG. 16A also illustrates at least some components further forming part of hook portion 1391 of catch element 1351, such as tip 1373, contact portion 1375, wall portion 1377, and recess 1379, with such components being further described in association with at least FIG. 18. Further details regarding a topography of the catch element 1350 are further described later in association with at least FIGS. 16A-18, and in particular FIG. 18.

With further reference to at least FIG. 15A, among other attributes, in some examples the hook portion 1391 of catch element 1350 also defines a pair of spaced apart vertices 1280A, 1280B, which perform a function similar to the prongs 280A, 280B of the examples in FIGS. 1-13. In some examples, vertex 1280A is defined by (or at) a junction of an outer side wall portion 1285A with a combination of the front edge portion 1392, the first beveled surface portion 1393, and the front border 1394. In some examples, vertex 1280B is defined by (or at) a junction of an outer side wall portion 1285B with a combination of the front edge portion 1392, the first beveled surface portion 1393, and the border 1394. As later shown in greater detail in at least FIG. 19D, the vertices 1280A, 1280B of the hook portion 1391 of the catch element 1350 are spaced apart by a distance which generally corresponds to a distance between the recesses 1138A, 1138B of the front portion 1130 of the cleat 1120. With this in mind, various positions of the catch element 1350 and operation of the biasing force, such as via spring 1500, are further described later in association with at least FIGS. 18-19D and 20-22. In some examples, each vertex 1280A, 1280B may sometimes be referred to as a prong.

FIG. 18 is a side sectional view of as taken along lines 18-18 in FIG. 16B and which further illustrates aspects at least some aspects of the catch element 1350, including hook portion 1391, and at least some aspects of biased rotational operation of the catch element 1350. As shown in FIG. 18, for illustrative purposes, the catch element 1350 is further represented according a mounted position on pin 310 and relative to front edge 1233A of base 1230 of receiver frame 1210, and spring arms 1502A, 1505, in a manner similar the representation in at least FIGS. 17 and 15A.

As shown in FIG. 18, in this mounted position the hook portion 1391 extends outwardly from central body 1351 generally toward the receiver frame 1210 in at least a generally rearward orientation toward receiver frame 1210. In addition to the elements mentioned in association with FIGS. 15A, 16A, the hook element 1391 comprises a tip 1373 formed at and by a junction of the front edge portion 1392 and a wall portion 1375. Together with rear wall portion 1377, the wall portion 1375 defines a recessed area including a corner 1379. This recessed area may sometimes be referred to as a mouth of the hook portion 1391. In some of these examples, the wall portion 1375 may be generally planar and in some examples wall portion 1375 and at least a portion of the wall portion 1377 may comprise a generally orthogonal relationship. In some examples, with or without tip 1373, at least a portion of the wall portion 1375 may provide a contact surface for releasably engaging a front portion 1130 of cleat 1120 such as, but not limited to, ledge 1137.

In some examples, the wall portion 1375 extends through, and defines, a first angular orientation A1 as shown in FIG. 18. In this way, the wall portion 1375 may provide a reference for defining an angular orientation associated with the hook portion 1391. In some examples, such a reference also may be implemented as a plane which extends through the tip 1373 and which is perpendicular to the back surface portion 1397 (and/or perpendicular to the longitudinal axis L2 of the effective single arm 1490 of the catch element 1350).

As shown in FIG. 18, in some examples the first angular orientation A1 defines a first end of a range of rotational movement (e.g. motion) of the hook portion 1391 of the catch element 1350. In some examples, in this mounted position of hook element 1391 (under influence of the rotational biasing force RF1), the first angular orientation A1 of wall portion 1375 forms an acute angle ε1 relative to a reference orientation, such as a plane P1 which is parallel to a plane through which a longitudinal axis L of the base 1230 (or receiver frame 1210) extends. In some examples, this first angular orientation A1 points downward and rearward toward the receiver frame 1210. The first angle ε1 (relative to the reference orientation) is between about 5 to about 25 degrees in some examples, about 10 to about 20 degrees in some examples, and about 15 (14.8, 14.9, 15, 15.1, 15.2) degrees in some examples.

With further reference to FIG. 18, upon rotational movement of the catch element 1350 against the rotational biasing force RF1 (in a manner similar to, but not limited to, the example of at least FIG. 9B) and in a direction away from the receiver frame 1210, the wall portion 1375 (and therefore the hook portion 1391 as a whole) exhibits a second rotational orientation B1 which still faces downward and rearward toward the base 1230 of the receiver frame 1210.

In some examples, this second rotational orientation B1 may define an opposite second end of the range of rotational movement of the hook portion 1391 of catch element 1350. In some such examples, the second angular orientation B1 still exhibits an acute angle relative to the plane P1, e.g. reference orientation.

In some examples, the second angular orientation B1 differs from the first angular orientation A1 by an angle ε2 of between about 5 to about 15 degrees, and in some examples, about 10 degrees. In some examples, a maximum difference may comprise about 10 degrees.

It will be understood that the hook portion 1391 (and catch element 1350 as a whole) may exhibit angular orientations between the first and second angular orientations A1, B1 during dynamic rotational movement of the catch element 1350 throughout the various aspects of engagement and release of the cleat 1120 relative to the catch element 1350, as further described in association with at least FIGS. 19A-22.

In some examples, the range of rotational movement of the hook portion 1391 of the catch element 1350 is defined so that, at all times, the wall portion 1375 is maintained with a generally downward and rearward orientation toward a front portion of cleat 1120 (when present) to facilitate secure, robust releasable engagement of the hook portion 1391, as further described below.

In some examples, the first end of the range of rotational movement (e.g. first angular orientation A1) of hook portion 1391 is at least partially determined by an angular orientation of the contact surface 1217 of extension members 1211A, 1211B of the receiver frame 1210, which was described in association with at least FIGS. 15A, 15B, 17. In particular, via the rotational biasing force RF1 shown in FIG. 18, the support wings 1411 of the catch element 1350 shown in FIGS. 16A-17 are forced into releasable engagement against the contact portion 1217 of extension members 1211A, 1211B, such as shown in FIG. 17, such that the angular orientation of the contact portion 1217 (of extension members 1211A, 1211B of receiver frame 1210) causes the support wings 1411 of catch element 1350 to assume the same angular orientation as the contact portion 1217. In particular, it will be understood that at least to the extent that the contact portion 1415A of the support wings 1411 (e.g. FIG. 16A) extends in a plane which is the same as, or generally parallel to, the plane through which a back surface portion 1397 (FIGS. 16A-18) of the central body 1351 extends, then the back surface portion 1397 of central body 1351 of catch element 1350 shown in FIG. 18 also will assume the same angular orientation (e.g. A2) as the contact portion 1217 of extension members 1211A, 1211B at the first end of the range of rotational movement.

This angular orientation is generally represented in FIG. 18 via dashed line A2, which extends at an angle θ1 relative to a plane Z which is perpendicular to a plane through which a longitudinal axis L of the base 1230 of the receiver frame 1210 extends.

With this background in mind, it will be further noted that in some examples the angular orientation of the wall portion 1375 of hook portion 1391 extends in a plane generally perpendicular to the back surface portion 1397 of catch element 1350 such that the action of contact portion 1217 of extension members 1211A, 1211B to limit rotational movement of the central body 1351 of the catch element 1350, ultimately causes the wall portion 1375 of hook portion 1391 to assume the first angular orientation A1 in FIG. 18 directed downward and toward the receiver frame 12110, as previously noted, when the back surface portion 1397 of central body 1351 is in the angular orientation A2.

Conversely, the second end of the range of rotational movement of the hook portion 1391 is at least partially determined by other constraints, such as a permissible range of rotational movement dictated by the spring 1500, which may be based on a structure of the spring and/or a magnitude of rotational biasing force RF1 exerted by the spring 1500. In some examples these factors associated with the spring 1500 may be selected and/or implemented to prevent the back surface portion 1397 of the central body 1351 of the catch element 1350 from rotating beyond a second angular orientation B2, which defines a second end of the range of rotational movement, as shown in FIG. 18. As previously noted, because of the generally perpendicular relationship between the back surface portion 1397 (of central body 1351) and the wall portion 1375 of hook portion 1391, the second angular orientation B2 of back surface portion 1397 necessarily results in the wall portion 1375 exhibiting a second angular orientation B1, which is the second end of range of rotational movement of the hook portion 1391 (e.g. wall portion 1375).

In some examples, the second angular orientation B2 may differ from the angular orientation A2 by the same example angles as previously described for the difference between the angular orientations A1 and B1 for wall portion 1375.

In some examples, because the tip 1373 of hook portion 1391 extends through generally the same plane as the wall portion 1375 (in some examples), the tip 1373 is constrained by (e.g. within) generally the same range of rotational movements (e.g. between the respective angular orientations A1, B1) as described for wall portion 1375 of hook portion 1391.

In view of these relationships, further attention will now be directed to the tip 1373 and/or front edge 1392 of the hook portion 1391 of catch element 1350 regarding how these elements are positioned and oriented for interaction with and engage the front portion 1130 of the cleat 1120.

In some examples, the general downward angular orientation of the tip 1373 of the hook portion 1391 of the catch element 1350 focuses a relatively greater magnitude of the downward component (arrow DF) of the rotational biasing force RF1 than if the contact wall portion 1375 (and tip 1373) had a neutral or generally upward orientation relative to the reference orientation (e.g. plane P). Moreover, in some examples, as further described later in association with at least FIGS. 19A-20, the recess 134 of the front portion 1130 of the cleat 1120 (e.g. FIG. 14A) is sized and shaped so that when the hook portion 1391 engages the recess 1134 (in a releasably secured position), the tip 1373 of the hook portion 1391 (of the catch element 1350) may be in pressing engagement at or in close proximity to a back edge 1129 of the ledge 1137, i.e. at or near a deepest part of the ledge 1137 of the recess 1134 at the front portion 1130 of cleat 1120. At least some of these operational aspects are further described later in association with at least FIG. 19D. Via this arrangement, the downward component DF of the rotational biasing force RF1 may be exerted at a point (or region) of the front portion 1130 of the cleat 1120 which is likely to significantly contribute to secure robust retention of the cleat 1120 within (and relative) to the receiver frame 1210 during an event (e.g. seated rowing) in which the user intends to maintain releasable retention of the cleat 1120 within the receiver frame 1210.

Moreover, by arranging for the tip 1373 of hook portion 1391 of the catch element 1350 to become positioned at or in close proximity to the back edge 1129 of the ledge 1137

(of the front portion 1130 of cleat 1120), in some examples the tip 1373 (and/or front edge 1392) of the hook element 1391 may exert a translational force component (see arrow TF* in FIG. 18) of the rotational biasing force RF1 against the wall 1136 of the front portion 1130 of cleat 1120. This translational force component may contribute, in combination with the downward component (DF), to robustly securing the front portion 1130 of the cleat 1120 within and relative to receiver frame 1210. In addition, this translation force component (TF*) also may forcibly push the footing 1150 of the cleat 1120 into the slot portion 1260 at the rear receiving portion 1240 of the receiver 1200, thereby increasing the overall secure robust retention of the cleat 1120 within (and relative to) the receiver 1200.

With this in mind, in some examples a position of the tip 1373 of the hook portion 1391 (in the mounted position schematically represented by FIG. 18) relative to the rotational axis defined by the pin 310 also may further significantly contribute to secure robust retention of the front portion 1130 of cleat 1120. In particular, by arranging for the tip 1373 (and/or front edge 1392) to be located close to the rotational axis (pin 310), any counter rotational upward forces (such as from a user's foot) will have less effect because this positioning of hook portion 1391 reduces leverage (based on a length of a "moment arm") by which such counter upward forces could potentially counter-act the rotational biasing force RF1 from spring 1500, and the downward angular orientation of the hook portion 1391.

With this in mind, in some examples a contact portion of the hook portion 1391 is aligned with at least a portion of rotational axis of the rotational biasing force (RF1) such as provided via spring 1500 (FIGS. 15A, 17). In some examples, this contact portion may comprise the tip 1373, contact wall portion 1375, and/or front edge 1392 of hook portion 1391. In some examples, this contact portion may comprise solely or primarily the tip 1373 of hook portion 1391, at least because the relatively smaller contact area offered by tip 1373 concentrates the downward force component (DF*) against the ledge 1137 of the front portion 1130 of the cleat 1120.

In some examples, a contact portion of the hook portion 1391 is substantially aligned with at least a portion of rotational axis of the rotational biasing force (RF1) such as provided via spring 1500 (FIGS. 15A, 17), wherein the contact portion comprises the tip 1373, contact wall portion 1375, and/or front edge 1392 of hook portion 1391. In this example arrangement, the contact portion is within a plane (represented by dash-dot-dash line V2) perpendicular to the plane through which the base 1230 of receiver frame 1210 extends. In the particular example shown in FIG. 18, the contact portion is defined by (or as) the tip 1373 of the hook portion 1391. In some examples, the plane V2 (representing a location of the contact portion) is located laterally from a center (CR in FIG. 18) of the rotational axis of the pin 310 (e.g. spring) by a distance X1 of about 90 percent to about 130 percent of the radius (R1) of pin 310 (e.g. rotational axis). The distance X1 may comprise between about 95 to about 125 percent of radius R1 in some examples, between about 100 to about 120 percent of radius R1 in some examples, between about 105 percent to about 115 percent of radius R1 in some examples, and about 110 (e.g. 109.7, 109.8, 109.9, 110, 110.1, 110.2) percent of radius R1 in some examples. It will be further understood that the representation of the distance X1 in FIG. 18 is merely schematically representative for illustrative purposes, and may not necessarily be to scale.

With further reference to at least FIG. 18 and as previously noted, in some examples the catch element 1350 comprises separate arms 1400A, 1400B and a common central body 1351 which supports hook portion 1391. In some examples, when considered from the perspective of exerting a rotational biasing force onto the front portion 1130 of cleat 1120, together the separate arms 1400A, 1400B and central body portion 1351 may be understood as effectively act as a single arm which is generally represented schematically via dashed lines 1490 in FIG. 18. In some such examples, a longitudinal axis (L2 in FIG. 18) of the effective single rotatable structure 1490 (i.e. effectively single arm) may be rotatably movable within a range of rotational movement between the first and second angular orientation A2, B2, as previously described for FIG. 18.

With the structure and relationships provided via FIGS. 14A-18, FIGS. 19A-22 provide further details regarding example methods of releasably retaining cleat 1120 relative to receiver 1200. For instance, as part of an example method, the user may begin releasably retaining their shoe (via cleat 1120) within receiver 1200 by positioning their shoe to cause the footing 1150 of the cleat 1120 to become removably received within the rear receiving portion 1240 of the receiver frame 1210. In some examples, aspects of this initial maneuver may be consistent with, or comprise at least some of substantially the same features and attributes as, the example previously described in association with at least FIGS. 7A-7B.

Upon seating the rear portion of the cleat 1120, an example method may further comprise the user pressing the front portion of their shoe downward to cause the front portion 1130 of cleat 1120 to slidably engage the catch element 1350 of the receiver 1200 to become releasably retained relative to the catch element 1350 and the receiver 1200 as a whole.

With this in mind, the top plan views of FIGS. 19A-19D schematically represent the interaction of the front portion 1130 of cleat 1120 and the catch element 1350 of receiver 1200 during such engagement. While just a portion of the catch element 1350 is shown for illustrative simplicity and clarity, it will be understood that operational movement of the catch element 1350 (relative to cleat 1120) shown in FIGS. 19A-19D is supported by, and at least partially determined by the structures, relationships, etc. of other aspects of the catch element 1250, extension members 1211A, 1211B, spring 1500, etc. as previously described in association with at least FIGS. 14A-18 and/or at least some structural aspects described in association with at least FIGS. 1-13.

Figure 8B:
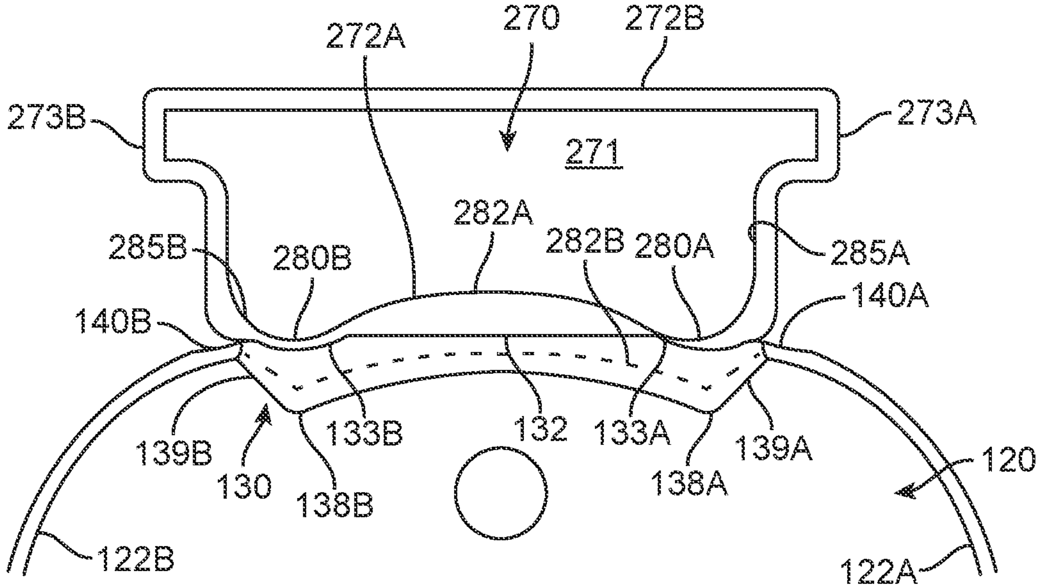

In some examples, the operational arrangement in FIG. 19A is analogous to at least some of the aspects of the operational arrangement in FIG. 8B, with front portion 1130 of cleat 1120 being rotated onto and in contact with an exterior surface of the hook portion 1391 of the catch element 1350, but prior to significant downward pressure being applied by the user. As shown in FIG. 19A, such a downward pressing force is represented by the circular X indicator. As shown in FIG. 19A, in this position in some examples a central front edge 1135 of cleat 1120 rests against a portion of the hook portion 1391 above the border 1394 (FIG. 18), while the protrusions 1131A, 1131B of cleat 1120 come to rest (e.g. land) laterally outside each of the respective outer side wall portions 1285A, 1285B of the hook portion 1391 of the catch element 1350. Via this arrangement, as the front portion 1130 of cleat 1120 is pressed downward (represented by the circular X), the front central edge 1135 of cleat 1120 slides downward against the exterior of the hook portion 1391 as the hook element 1391 rotates away from the receiver frame 1210 in response to the pressure of cleat 1120. During this operation, in some examples the outer lateral protrusions 1131A, 1131B of the cleat 1120 at least partially laterally constrain the front portion 1130 of cleat 1120 to help maintain a desired and proper alignment of the front portion 1130 of cleat 1120 relative to the catch element 1350.

Figure 19B:
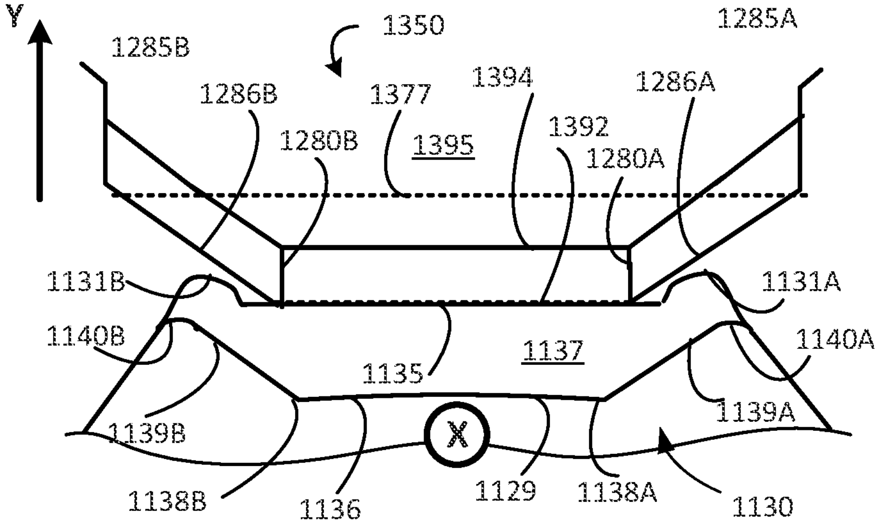

In some examples, the operational arrangement in FIG. 19B is analogous to at least some of the aspects of the operational arrangement in the example of FIGS. 9A-9B. As shown in FIG. 19B, with the user supplying continued downward pressure (represented by the circular X) on front portion 1130 of cleat 1120 (with the continued sliding engagement on catch element 1350), the catch element 1350 will be rotated further (represented via arrow Y) in a direction away from the front portion 1130 of cleat 1120 until the central front edge 1135 of cleat 1120 slides into contact with the front edge 1392 of hook portion 1391. This position corresponds to a point in time just before a transition in which the ledge 1137 of the front edge 1132 of cleat 1120 slides past and underneath the front edge 1392 of the hook portion 1391 of catch element 1350. While general lateral spacing is shown in FIG. 19B between the lateral outer protrusions 1131A, 1131B of the front portion 1130 of cleat 1120 relative to the vertices 1280A, 1280B (e.g. prongs) of the catch element 1350, it will be understood that in some examples the lateral outer protrusions 1131A, 1131B may still be in close proximity to (and/or in slidable contact with) the outer side wall portions 1285A, 1285B of the catch element 1350 to maintain alignment of the front portion 1130 of cleat 1120 with the catch element 1350.

Figure 19C:
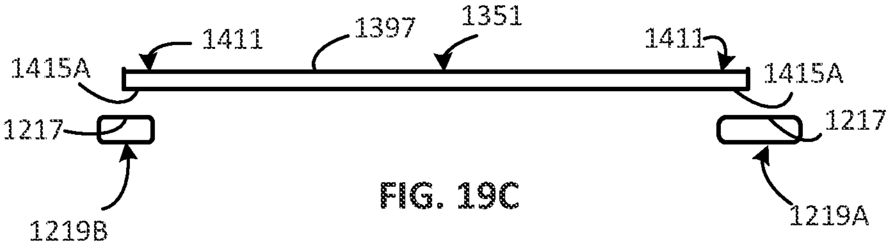
FIG. 19C is a diagram including a top plan view schematically representing one example interaction of a contact portion of a catch element relative to a contact portion of an extension member of a receiver frame.

In association with the operational example of FIG. 19B, FIG. 19C is a simplified top plan view schematically representing a position of support wings 1411 (e.g. FIGS. 16A-17) of the catch element 1350 relative to the contact portion 1217 (e.g. FIGS. 15A-15B, 17) of extension members 1211A, 1211B of the receiver frame 1210, such as when the catch element 1350 is in the operational position shown in FIG. 19B in which the catch element 1350 is being forcibly rotated in an orientation away (arrow Y) from the front portion 1130 of the cleat 1120. In one aspect, the position of the support wings 1411 in FIG. 19C may correspond to the previously described second angular orientation B2 in FIG. 18, which may comprise a second end of a range of rotational movement of catch element 1350.

Figure 19D:
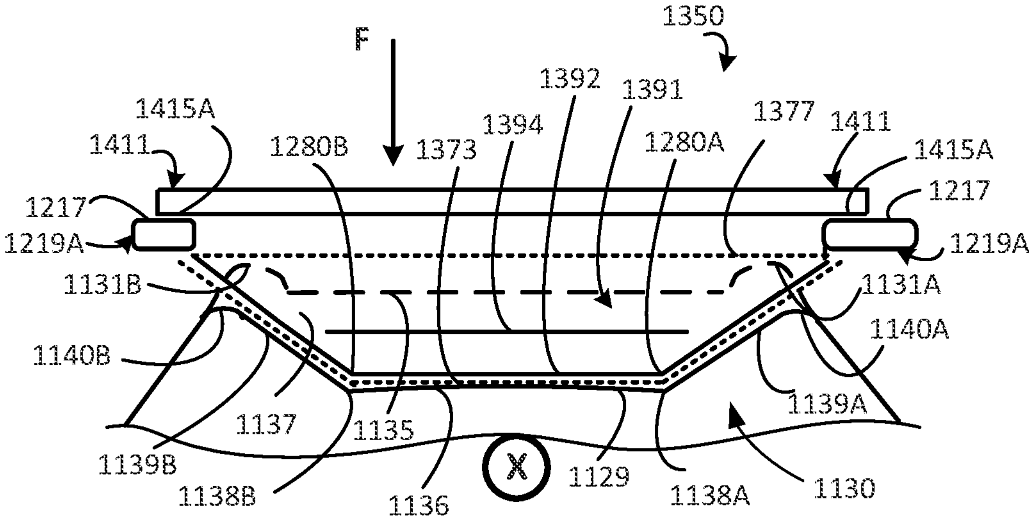

In some examples, the operational arrangement in FIG. 19D is analogous to at least some of the aspects of the operational arrangement in the example of FIG. 9C. As shown in FIG. 19B, as part of and/or following the transition occurring in association with FIG. 19B in which the front edge 1392 of the hook portion 1391 (of catch element 1350) slides over the front edge 1135 of the cleat 1120 and onto ledge 1137, the front edge 1392 of the hook portion 1391 of catch element 1350 rapidly slides across a top surface of the ledge 1137 of cleat 1120 (as represented by arrow F) and into contact against (or in close proximity to) the back edge 1129 of the recess 1134 and wall 1136 of front portion 1130 of cleat 1120, as depicted in FIG. 19D. In this position, the vertices 1280A, 1280B (e.g. prongs) of the hook portion 1391 of the catch element 1350 become releasably mated within (and relative to) the recesses 1138A, 1138B (respectively) of the front portion 1130 of the cleat 1120. As part of this releasable mating, the outer side wall portions 1285A, 1285B of the hook portion 1391 (of catch element 1350) become releasably engaged against (or in close proximity to) the inner side wall portions 1139A, 1139B (respectively) of the front portion 1130 of cleat 1120.

With this general arrangement of releasable engagement, in some examples the tip 1373 of the hook portion 1391 (as part of a lower portion of front edge 1392) also may become releasably engaged against at least a portion of the back edge 1129 of ledge 1137 and/or wall 1136 of front portion 1130 of cleat 1120.

In this position and with the downward pressure (and translation forces) of the rotational biasing force (RF1 in FIG. 18), the front portion 1130 of cleat 1120 becomes robustly secured in releasable engagement relative to the hook portion 1391 of the catch element 1350 in a manner by which the catch element 1350 may significantly hinder or prevent vertical dislodgement of the front portion 1130 of cleat 1120 from the receiver 1200 despite significant upward forces which might be exerted via a user's shoe and foot during high power activities such as, but not limited to, rowing activities.

In some examples, the operational arrangement shown in FIG. 19D may correspond to the first angular orientation (e.g. A1, A2) of catch element 1350 as shown in FIG. 18 and the contact surface portion 1415A of support wings 1411 of catch element 1350 being in releasable contact against the contact portions 1217 of extension members 1211A, 1211B (e.g. FIG. 15A-15B), which is also illustrated in FIG. 19D.

In some examples, in combination with the above-described downward pressure (and translational forces) from the rotational biasing force (e.g. RF1 in FIG. 18) of spring 1500, the releasably mating of the outer side wall portions 1285A, 1285A of catch element 1350 relative to the inner side wall portions 1139A, 1139B of cleat 1120 (and the associated releasable mating of the vertices 1280A, 1280B relative to recesses 1138A, 1138B) may significantly hinder or prevent inadvertent, unintentional lateral dislodgement of the front portion 1130 of cleat 1120 from the receiver 1200.

However as further described below in association with at least FIGS. 20-22, upon an intentional application of sufficient lateral force to the front portion 1130 of the cleat 1120, the front portion 1130 may be released from the catch element 1350 so that the entire cleat 1120 may be removed (along with the entirety of a shoe on which the cleat 1120 is mounted) from the receiver 1200. Because the various elements of the front portion 1130 of the cleat 1120 and of the hook portion 1391 of the catch element 1350 are arranged in a symmetric manner, the front portion 1130 of the cleat 1120 may be released in either a left orientation or a right orientation relative to the receiver 1200. Moreover, because of this operational arrangement, the same releasable fastening device 1000 (including a cleat 1120 and receiver 1200) may be mounted for a left foot shoe or a right foot shoe, thereby simplifying manufacturing, storage, distribution, etc., as well as replacement of components if necessary.

FIG. 20 is a top plan view schematically representing a cleat 1120, which is releasably mounted within (and relative to) a receiver 1200, including the catch element 1350 of receiver 1200 releasably retaining the front portion of the cleat 1120 and the footing 1150 of cleat 1120 being releasably retained within housing 1250 of receiver 1200. As previously noted, this operational arrangement corresponds to a mode in which the cleat 1120 and receiver 1200 cooperate during normal use of the releasable fastening device 1000 of FIGS. 14A-22.

In order to release the cleat 1120 from the receiver 1200, a user may exert a lateral rotational force LRF1 (via their shoe to which the cleat 1120 is mounted) on the front portion 1130 of cleat 1120 relative to the fixed receiver frame 1210, as shown in FIG. 20. In a manner consistent with the operational arrangement in FIGS. 10A-10B, this lateral rotational force LRF1 exerts a lateral force LF1 through at least inner side wall portion 1139A, which exerts pressure against outer side wall portion 1285A of the catch element 1350 which then slidably forces the front portion (e.g. front edge 1392 of hook portion 1391) of the catch element 1350 rearward and upward (in a manner analogous to FIG. 10B) to enable slidable movement of the front portion 1130 of cleat 1120 laterally relative to the front edge 1392 of catch element 1350, which is further represented by FIG. 21.

In general terms, the operational arrangement shown in FIG. 21 is generally analogous to the operational arrangement previously described in association with FIGS. 11A-11B.

As further shown in FIG. 21, during the lateral rotational sliding movement of the front portion 1130 of cleat 1120 relative to the fixed position of receiver frame 1210, the prong 1140A of cleat 1120 remains in sliding engagement with the front edge 1392 of hook portion 1391 of catch element 1350 with protrusion 1131A (of front portion 1130 of cleat 1120) also slidably engaging a bottom (e.g. tip 1373) of the front edge 1392 and/or wall portion 1375 of the hook portion 1391 of catch element 1350. Via this interaction and the rear footing 1150 being retained within slot portion 1260 at the rear portion of the receiver frame 1210, the front portion 1130 of cleat 1120 is maintained in a stable orientation during the process of releasing the front portion 1130 of cleat 1120 from the catch element 1350 of receiver 1200.

With further reference to FIG. 21, at the same time the footing 1150 of the cleat 1120 slidably rotates within the slot portion 1260 of housing 1250 of receiver 1200 as represented by arrow R5 in a manner consistent with the capabilities of footing 1150, housing 1250, and recessed contact portion 1248, as previously described in association with at least FIGS. 14A-15B. Via this operational arrangement, the rear portion of the cleat 1120 is stably maintained relative to receiver frame 1210 during the lateral rotation of the front portion 1130 of the cleat 1120.

In some examples, the operational arrangement of footing 1150 being retained within the slot portion 1260 of housing 1250 (and recessed contact portion 1248) is maintained during substantially the entire process of releasing the cleat 1120 from the receiver 1200 until the front portion 1130 of cleat 1120 has rotated laterally a sufficient degree to a position like that shown in FIG. 22 in which the front portion 1130 of cleat 1120 may be lifted upward, as represented by arrow symbol G. During such upward lifting movement, the footing 1150 of cleat 1120 may move forward (as represented by arrow E) to exit the slot portion 1260 (of housing 1250 of receiver 1200) and exit the recessed contact portion 1248.

This example operational arrangement represented by at least FIG. 21 stands in contrast to the operational arrangement in the example of FIGS. 11C-12B, in which a footing 150 of the cleat 120 acts to help dislodge the cleat 120 from the receiver frame 210 during an intentional maneuver to release the cleat 120 from the receiver 200. Accordingly, at least some aspects of the example of FIGS. 11C-12B are not applicable to the example operational arrangement of FIGS. 21-22, in some examples.

As further shown in FIG. 22, as the front portion 1130 of cleat 1120 laterally moves out of the way, the catch element 1350 may rotate rearward (as represented by arrow R4) toward the receiver frame 1210 to return to a default angular orientation (e.g. A1, A2 in FIG. 18).

It will be understood that the examples illustrated in association with FIGS. 1-13 and/or FIGS. 14A-22 represent example devices for, and/or examples methods of, releasably retaining or fastening a cleat relative to a receiver. In some examples, at least some of the features and attributes of the examples of FIGS. 1-13 can be applied in a manner complementary with at least some of the features and attributes of the examples of FIGS. 14A-22, and vice versa.

Via such example arrangements, a user wearing a shoe with a cleat (e.g. 1120) may conveniently step into a receiver 1200 with confidence that their cleat (and associated shoe) will be robustly, securely retained by the receiver 1200 during their expected activities without unexpected, inadvertent dislodgement. Thereafter, at a time of their choosing, the user may conveniently cause release of the cleat (and therefore shoe) from the receiver by a simple, forceful lateral rotation of the cleat (and associated shoe) relative to the receiver.

Figure 23:
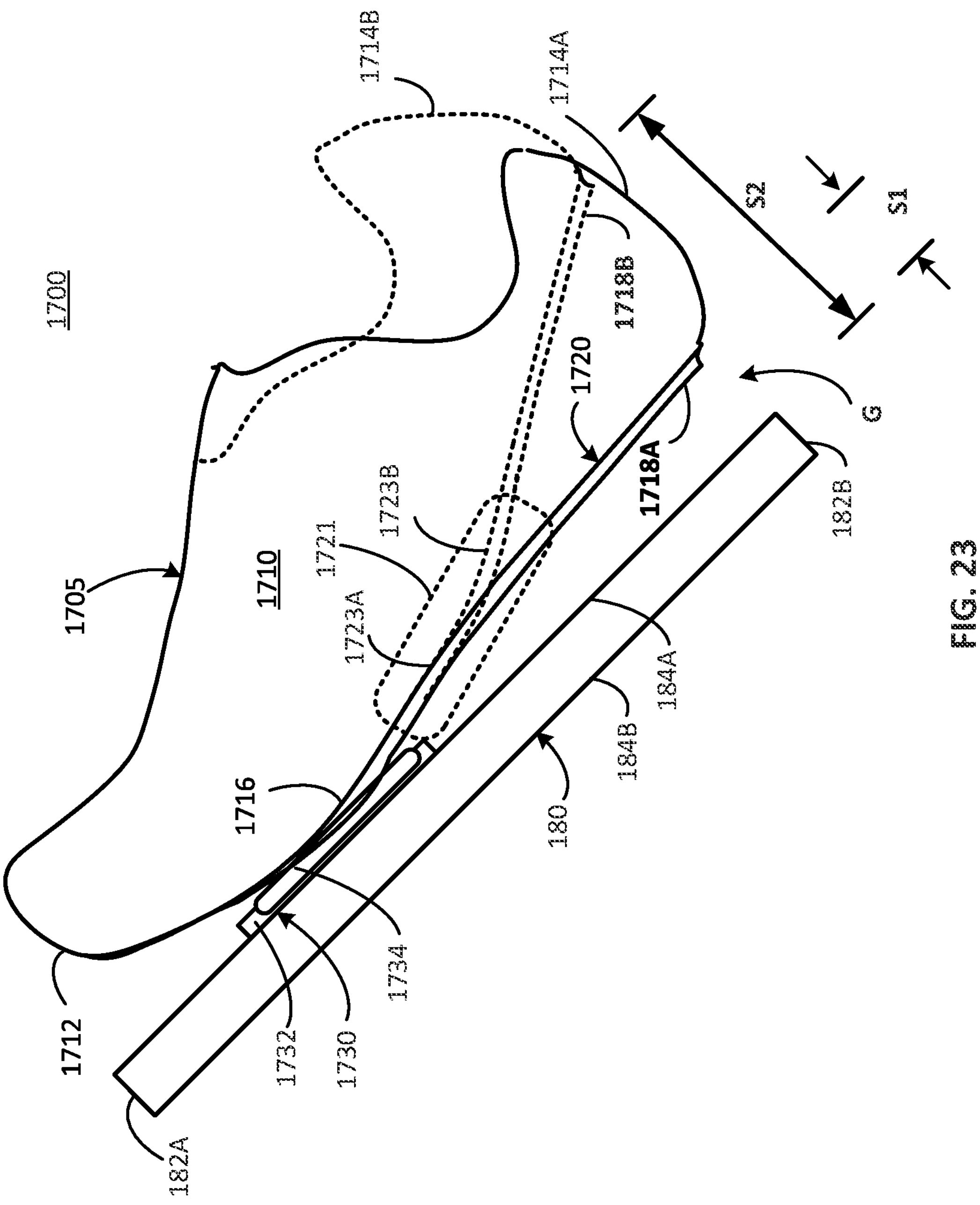
FIG. 23 is a diagram including a side view schematically representing an example of retaining a rear portion of a shoe within a predetermined distance of a support.

FIG. 23 is a diagram 1700 including a side view schematically representing an example shoe 1705 releasably mounted, via a retention device 1730, relative to a support 180. As shown in FIG. 23, the shoe 1705 may comprise an upper 1710 and a sole 1720 which extends between a toe 1712 and back portion 1714A (solid lines), 1714B (dashed lines) of the shoe 1705, with at least a portion of the sole 1720 defining a heel portion 1718A, 17188. In some examples, the retention device 1730 may comprise a cleat 1732 mounted on a ball portion 1715 of the shoe 1705 and may comprise a receiver 1734 mounted on the support 180. The support 180 may comprise a first end 182A and opposite second end 182B, as well a top surface 184A and an opposite bottom surface 184B. The support 180 may be mounted relative to a boat, an exercise device, and the like. As shown in FIG. 23, upon removable insertion of the cleat 1732 within (and relative to) receiver 1734, the sole 1720 (and the shoe 1705 as a whole) becomes releasably retained relative to the support 180. In some examples, the releasable retention device 1730 may comprise at least some of substantially the same features and attributes as the examples described in association with FIGS. 1-22.

Via this general arrangement shown in FIG. 23, a gap G may be present between the heel portion 1714A (shown in solid lines) of shoe 1705 and the top surface 182A of the support 180. In some examples, the gap G comprise a separation distance 51 which may be exhibited when the user is in a rest state and/or performing at least some rowing-related functions. This position corresponds to the depiction of the shoe 1705 in solid lines.

However, during many rowing-related functions, the various portions of a user's leg (e.g. thigh, knee, lower leg, ankle, foot) undergo frequent changes in orientation, angle, position, force, etc. During some of these rowing-related functions, the user may exert pressure on the shoe 1705 causing the example shoe 1705 to flexibly bend (i.e. "flex) in a mid-region 1721 of sole 1720 (and associated portions of upper 1710), which may result in the heel portion 1718B being further separated from the support 180, as represented in FIG. 23 with portions of the shoe 1705 and sole 1720 being shown in dashed lines. The separation distance may vary in a dynamic manner throughout a sequence of different rowing-related functions.

As further shown in FIG. 23, one example increased separation distance may be represented by the indicator S2. In some examples, the separation distance S2 may corresponds to a criteria, such as a maximum distance which may not be exceeded during a competition. In some such examples, the separation distance S2 may comprise about 1.5 inches (e.g. 1.48, 1.49, 1.5, 1.51, 1.52 inches) and may be determined by an organization regulating sports or other activities. It will be understood that, in the absence of some sort of restraining structure or force, in some examples the heel portion 1718B could exceed the separation distance S2.

Therefore, in order to ensure compliance with the maximum separation distance S2, heel tie-downs are one type of external restraint commonly used to prevent the heel portion 1714A (shown in solid lines) from being lifted (1714B in dashed lines) beyond the maximum separate distance S2 away from the top surface 182A of the support 180.

However, in some examples of the present disclosure, use of such heel tie-downs may be avoided by forming the sole 1720 of a material having a suitable hardness which lends sufficient stiffness to the bottom of the shoe 1705 to enable proper rowing technique throughout various rowing-related functions and/or maintaining structural integrity of the shoe 1705. On the other hand, at least some portions of the example sole 1720 of shoe 1705 also are to exhibit enough flexibility to facilitate particular proper rowing techniques to accommodate the changing forces and positions of the user's body (e.g. feet, ankles, lower leg, etc.) while still preventing violation of the maximum separation distance S2.

In some examples, in order to enable the user to perform the rowing-related functions in an appropriate manner while not exceeding the maximum separation distance S2 while also contributing to the cleat 1732 being retained within the receiver 1734, the sole 1720 may be formed of a material 1720 comprising a Shore D hardness between about 38 and about 44. In some examples, the Shore D hardness of the sole 1720 may comprise between about 39 and about 42. In some examples, the Shore D hardness of the sole 1720 may comprise about 40 (e.g. 39.8, 39.9, 40, 40.1, 40.2). In some such examples, the sole 1720 may be formed of a plastic material such as, but not limited to, a thermoplastic polyurethane material.

With sole 1720 exhibiting these properties, the mid-portion 1723A (in solid lines) of sole 1720 may be "flexed" into different orientations during some rowing-related functions such as flexing into the orientation shown in dashed lines 1723B, which enables the heel portion 1718B to be further separated from the support 180. However, based on the above-noted example hardness (e.g. Shore D hardness), the sole 1720 as a whole (including the mid-portion 1723A, 1723B exhibits enough stiffness to prevent the heel portion 17188 from exceeding the maximum separation distance.

In one aspect, this carefully struck balance of stiffness and flexibility (implemented via the above-noted hardness of the material forming the sole 1720) may be understood as providing an on-board restraint well-suited to comply with a maximum heel separation distance versus external restraints such as heel tie-downs. Such external restraints may impose additional costs, complications, safety considerations, etc.

Via this example arrangement in FIG. 23 relating to sole 1720, a user may confidently and rigorously perform all their desired rowing-related activities while being compliance with a maximum heel separation distance (e.g. S2) without the use of an external restraint and without the shoe 1705 contributing to unintended dislodgement of the cleat 1732 from the receiver 1734 on support 180.

It will be understood that the example illustrated in association with FIG. 23 represents an example device for, and/or an example method of, releasably retaining or fastening a cleat relative to a receiver. In some examples, at least some of the features and attributes of the examples of FIG. 23 can be applied in a manner complementary with at least some of the features and attributes of the examples of FIGS. 1-22, and vice versa.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A device comprising:

a cleat mountable to a shoe and including a front portion and a rear footing, wherein the front portion of the cleat comprises:

a pair of laterally spaced apart prongs;

a recess extending laterally between the respective prongs;

a front wall; and a ledge extending forward from, and generally perpendicular to the front wall, with both the ledge and the front wall laterally extending between the prongs to at least partially define the recess, wherein the ledge comprises:

a central front edge; and a pair of protrusions which extend outwardly from the central front edge, with each respective protrusion being adjacent a respective one of the prongs, and wherein the respective protrusions are located at opposite ends of the central front edge of the ledge; and a receiver mountable to a support of an external device and comprising a base including:

a rear portion to removably slidably receive the rear footing of the cleat, a front portion comprising a catch element, which is pivotally movable relative to the base while under a rotational biasing force in a first orientation, to permit slidable entry of, and retention of, the front portion of the cleat relative to the base, wherein, upon exertion of an external force via the shoe laterally in a second orientation perpendicular to the first orientation, lateral sliding forcible movement of the front portion of the cleat overcomes at least a downward component of the rotational biasing force to cause rotation of the catch element in a third orientation, opposite the first orientation, to permit further slidable lateral movement, and release of, the front portion of the cleat relative to the catch element.

2. The device of claim 1, wherein the front wall of the cleat comprises a central wall portion and inner side wall portions on opposite ends of the central portion.

3. The device of claim 2, wherein the front wall of the cleat comprises outer side wall portions on opposite sides of the prongs.

4. The device of claim 3, wherein the spaced apart prongs comprise:

a first prong formed by a junction of a respective one of outer side wall portions and a respective one of the inner side wall portions; and a second prong formed by a junction of the other respective outer side wall portion and the other respective inner side wall portion.

5. The device of claim 2, wherein the front portion of the cleat comprises a pair of laterally spaced apart recesses with each recess formed by a junction of the ledge, the central wall portion, and a respective one of the inner side wall portions.

6. The device of claim 5, wherein the recesses comprise a V-shape.

7. The device of claim 5, wherein each inner side wall portion forms an angle of about 30 to about 40 degrees relative to a short of the cleat.

8. The device of claim 5, wherein the central wall portion comprises a convex shape.

9. The device of claim 1, wherein the central front edge comprises a linear shape.

10. The device of claim 1, wherein each protrusion extends forward relative to each of the prongs.

11. The device of claim 1, wherein a distance between the protrusions of the front edge generally corresponds to a distance between a pair of laterally spaced apart vertices of the front edge portion of the hook portion of the catch element of the receiver.

12. The device of claim 1, wherein the base of the receiver comprises:

a pair of extension members laterally spaced apart along, and extending outwardly from, a front edge of the base, with each extension member comprising a collar portion defining a hole to receive a pin.

13. The device of claim 12, wherein each extension member comprises an upper protrusion, and a combination of the collar portion and the upper protrusion define a contact surface portion.

14. The device of claim 12, wherein the catch element comprises a pair of arms laterally spaced apart from each other with a central body extending between the respective arms.

15. The device of claim 14, wherein each arm comprises a collar portion defining a hole to slidably receive and to be pivotally mounted relative to a pin.

16. The device of claim 12, wherein a distance between an outer surface of the respective arms of the catch element is equal a distance between an inner surface of the respective collar portions of the extension members of the base of the receiver, and wherein the hole of the collar portion of the catch element is alignable with a hole of the collar portion of the extension member for slidable receiving a pin and pivotal mounting of the arms relative to the extension members.

* * * * *